(12) United States Patent
Yamada et al.

(10) Patent No.: US 8,986,422 B2
(45) Date of Patent: Mar. 24, 2015

(54) METHOD FOR PRODUCING NICKEL NANOPARTICLES

(75) Inventors: Katsuhiro Yamada, Fukuoka (JP); Shuji Inoue, Fukuoka (JP); Hiderou Nomoto, Fukuoka (JP); Tomohisa Yamauchi, Osaka (JP); Yuji Wada, Osaka (JP); Yasunori Tsukahara, Osaka (JP)

(73) Assignees: Nippon Steel & Sumikin Chemical Co., Ltd., Tokyo (JP); Osaka University, Osaka (JP); Iwatani Corporation, Osaka (JP)

(*) Notice: Subject to any disclaimer, the term of this patent is extended or adjusted under 35 U.S.C. 154(b) by 314 days.

(21) Appl. No.: 13/634,881

(22) PCT Filed: Mar. 17, 2011

(86) PCT No.: PCT/JP2011/056407
§ 371 (c)(1),
(2), (4) Date: Sep. 14, 2012

(87) PCT Pub. No.: WO2011/115213
PCT Pub. Date: Sep. 22, 2011

(65) Prior Publication Data
US 2013/0008286 A1 Jan. 10, 2013

(30) Foreign Application Priority Data

Mar. 17, 2010 (JP) .................... 2010-060772
Mar. 17, 2010 (JP) .................... 2010-060774
Mar. 17, 2010 (JP) .................... 2010-060775
Mar. 17, 2010 (JP) .................... 2010-060776

(51) Int. Cl.
*B22F 9/24* (2006.01)
*B82Y 40/00* (2011.01)
*B22F 9/30* (2006.01)

(52) U.S. Cl.
CPC . *B22F 9/24* (2013.01); *B82Y 40/00* (2013.01); *B22F 9/305* (2013.01); *Y10S 977/896* (2013.01)
USPC ............................. 75/345; 75/374; 977/896

(58) Field of Classification Search
None
See application file for complete search history.

(56) References Cited

U.S. PATENT DOCUMENTS

| 7,648,554 B2 * | 1/2010 | Nakamoto et al. ............ 75/343 |
| 2005/0204865 A1 * | 9/2005 | Hirai et al. ..................... 75/345 |
| 2006/0133990 A1 * | 6/2006 | Hyeon et al. .................. 423/622 |
| 2009/0148600 A1 * | 6/2009 | Li et al. ......................... 427/256 |

FOREIGN PATENT DOCUMENTS

| CN | 1768987 | 5/2006 |
| CN | 1876291 | 12/2006 |
| JP | 2008-031104 | 2/2008 |
| JP | 2009-024254 | 2/2009 |
| JP | 2009-270146 | 11/2009 |
| JP | 2010-037647 | 2/2010 |

OTHER PUBLICATIONS

Yasunori Tsukahara et al., "Heterogeneous Reaction System Using Metal Nanoparticle Catalysts under Microwave Irradiation", Catalysts & Catalysis, vol. 51, No. 6, Sep. 10, 2009, pp. 417-419, with English abstract thereof, total 4 pages.

Tomohisa Yamauchi et al., "Microwave-Assisted Synthesis of Monodisperse Nickel Nanoparticles Using a Complex of Nickel Formate with Long-Chain Amine Ligands", Bulletin of the Chemical Society of Japan, Aug. 2009, vol. 82, No. 8, pp. 1044-1051.

* cited by examiner

*Primary Examiner* — George Wyszomierski
(74) *Attorney, Agent, or Firm* — Jianq Chyun IP Office

(57) ABSTRACT

A method for producing nickel nanoparticles is described, including a first step of heating a mixture of a nickel carboxylate with 1-12 carbon atoms in its moiety excluding —COOH and a primary amine to obtain a complexed reaction solution with a nickel complex foiiiied therein, and a second step of heating the complexed reaction solution by a microwave to obtain a Ni-nanoparticle slurry. In the first step, the heating is preferably conducted at a temperature of 105-175° C. for 15 minutes or longer. In the second step, the heating is preferably conducted at a temperature of 180° C. or higher.

20 Claims, 10 Drawing Sheets

METHOD FOR PRODUCING NICKEL NANOPARTICLES

CROSS-REFERENCE TO RELATED APPLICATION

This application is a 371 of international application of PCT application Ser. No. PCT/JP2011/056407, filed on Mar. 17, 2011, which claims the priority benefit of Japan application No. 2010-060772, 2010-060774, 2010-060775 and 2010-060776, all of which are filed on Mar. 17, 2010. The entirety of each of the above-mentioned patent applications is hereby incorporated by reference herein and made a part of this specification.

BACKGROUND OF THE INVENTION

1. Field of Invention

This invention relates to a method for producing nickel nanoparticles.

2. Description of Related Art

Since nickel nanoparticle is cheaper and also more chemically stable than noble metal nanoparticles such as silver nanoparticle, its application to catalysts, magnetic materials, electrodes of multilayer ceramic capacitors and so on is expected. Nickel nanoparticles are conventionally prepared through a solid-phase or liquid-phase reaction. Known solid-phase reactions include chemical vapor deposition using nickel chloride, thermolysis of nickel formate, and so on. Known liquid-phase reactions include: direct reduction of a nickel salt such as nickel chloride by a strong reductant such as sodium borohydride, thermolysis of a precursor such as $[Ni(H_2NNH_2)_2]SO_4 \cdot 2H_2O$ that is formed by adding a reductant such as hydrazine in presence of NaOH, hydrothermal synthesis by loading a nickel salt such as nickel chloride or a nickel complex containing organic ligands together with a solvent in a pressurized container, and so on.

In order to supply nickel nanoparticles suitable for the above applications such as catalysts, magnetic materials and electrodes, it is necessary to control the particle sizes of the nickel nanoparticles to be uniform and less than 150 nm approximately.

However, in the method utilizing chemical vapor deposition among the methods utilizing solid-phase reactions, the particle is increased in size in an order of sub-micron to micron. Moreover, in the method utilizing thermolysis, the particles aggregate due to the high reaction temperature. Further, as compare with those utilizing liquid-phase reactions, the methods utilizing the solid-phase reactions have higher production costs.

On the other hand, in a method of liquid-phase reaction using a strong reductant, nickel is immediately reduced so that controlling the reaction to produce particles with desired particle sizes is difficult. Moreover, in the method utilizing a precursor, the precursor tends to gelate and renders the subsequent reduction reaction inhomogeneous, while in the hydrothermal synthesis method, the reaction temperature is high. Hence, aggregation cannot be prevented in any of these cases.

With respect to the liquid-phase reaction techniques, a method for producing Ni nanoparticles has been disclosed (in Patent Document 1), including a step of preparing a mixed solution by adding a reductant, a dispersant and a nickel salt in a polyol solution, a step of stirring and heating the mixed solution, and a step of reacting the same to form nickel nanoparticles. However, with this producing method, nickel nanoparticles with a high dispersity are not necessarily obtained well. Moreover, if there is residual reductant as an impurity in the nickel nanoparticles, depending on the application of the nickel nanoparticles, there are cases where the product quality is affected.

Moreover, a technique for producing Ni nanoparticles, which includes mixing a nickel precursor material, an organic amine and a reductant and then heating the same, has been disclosed (in Patent Document 2). However, when a strong reductant is used in the method, the reduction reaction is difficult to control, and Ni-nanoparticles with a high dispersity are not necessarily obtained well. On the other hand, when a weak reductant is used, high-temperature heating is required to reduce to metallic nickel that has a negative redox potential, and accompanying reaction control is demanded.

PRIOR-ART DOCUMENTS

Patent Documents

Patent Document 1: Japanese Patent Publication No. 2009-024254

Patent Document 2: Japanese Patent Publication No. 2010-037647

SUMMARY OF THE INVENTION

Problems to be Solved by the Invention

An object of this invention is to provide a method for producing nickel nanoparticles, which is a simple method based on a liquid-phase reaction, and allows the obtained nickel nanoparticles to have suitable magnitude and distribution of particle sizes and a suitable shape.

Means for Solving the Problems

The method for producing nickel nanoparticles of this invention includes a first step and a second step. The first step includes heating a mixture of a nickel carboxylate and a primary amine to obtain a complexed reaction solution with a nickel complex formed therein, wherein the nickel carboxylate has 1-12 carbon atoms in its moiety excluding —COOH. The second step includes heating the complexed reaction solution by a microwave to Rhin a Ni-nanoparticle slurry.

In the method for producing nickel nanoparticles of this invention, the heating in the first step can be conducted at a temperature of 105-175° C.

Moreover, in the method for producing nickel nanoparticles of this invention, the heating in the second step can be conducted at a temperature of 180° C. or higher.

Moreover, in the method for producing nickel nanoparticles of this invention, the nickel carboxylate may have 1-8 carbon atoms in its moiety excluding —COOH.

Moreover, in the method for producing nickel nanoparticles of this invention, the primary amine may include an aliphatic amine.

Moreover, in the method for producing nickel nanoparticles of this invention, the aliphatic amine may include oleylamine or dodecylamine.

Moreover, the method for producing nickel nanoparticles of this invention may use, in the first step, a nickel carboxylate having a straight chain of 1 or 2 carbon atoms as its moiety excluding —COOH, and may further comprise, between the first and second steps, a step of adding, in the complexed reaction solution, one, two or more metal salt selected from the group consisting of palladium salts, silver salts, platinum salts and gold salts. In the step of adding the metal salt(s) in such embodiments, the metal salt(s) may be added in a manner such that, in terms of metal, the amount of the metal therein is 0.01 part by mass or more relative to 100 parts by mass of the nickel contained in the nickel carboxylate.

In the method for producing nickel nanoparticles of this invention, the heating in the second step may be conducted in a state that a multi-valent carboxylic acid of 3 or more valences is present in the complexed reaction solution. In such a case, at least before the heating in the second step, the multi-valent carboxylic acid can be added in the stage of preparing the mixture, or added in the mixture or in the complexed reaction solution. The multi-valent carboxylic acid may include an acyclic carboxylic acid.

In the method for producing nickel nanoparticles of this invention, the multi-valent carboxylic acid can be added in an amount of 3 or more parts by mass relative to, in terms of metal, 100 parts by mass of the nickel contained in the nickel carboxylate.

In the method for producing nickel nanoparticles of this invention, at least before the microwave irradiation, a salt of a refractory metal having a melting point higher than that of nickel can be added in the stage of preparing the mixture or added in the mixture or in the complexed reaction solution, and then the microwave heating is conducted. In such a case, the salt of refractory metal can be mixed with the nickel carboxylate and the primary amine to prepare the mixture in the first step.

In the method for producing nickel nanoparticles of this invention, the salt of refractory metal may include one selected from the group consisting of tungsten salts, molybdenum salts, vanadium salts and niobium salts, or include a mixture of two or more selected from the same group.

In the method for producing nickel nanoparticles of this invention, the salt of refractory metal can be added in a manner such that, in terms of metal, the amount of the metal therein is 1 to 30 parts by mass relative to 100 parts by mass of the nickel in the nickel carboxylate.

The method for producing nickel nanoparticles of this invention can further include a step that includes: adding a salt of a refractory metal having a melting point higher than that of nickel to the Ni-nanoparticle slurry obtained in the second step, and heating the slurry by a microwave to compounding the refractory metal with the nickel nanoparticles.

In the method for producing nickel nanoparticles of this invention, the temperature of the heating by microwave irradiation in the second step may be 240° C. or higher, such that the organic substance present on the surfaces of the nickel nanoparticles as formed is carbonized.

The method for producing nickel nanoparticles of this invention may further include a step of re-heating the nickel nanoparticles formed in the second step to 240° C. or higher temperature, such that the organic substance present on the surfaces of the nickel nanoparticles is carbonized. In such a case, it is preferred to re-heat the nickel nanoparticles in presence of a primary amine.

In the method for producing nickel nanoparticles of this invention, nickel formate may be added together with the nickel carboxylate having 1-12 carbon atoms in its moiety excluding —COOH, in an amount of 5-50 mol % relative to the entire nickel carboxylate.

Effects Of The Invention

The method for producing nickel nanoparticles of this invention is a simple method based on a liquid-phase reaction, and allows the obtained nickel nanoparticles to have suitable magnitude and distribution of particle sizes and a suitable shape.

DESCRIPTION OF EMBODIMENTS

Figure 1:
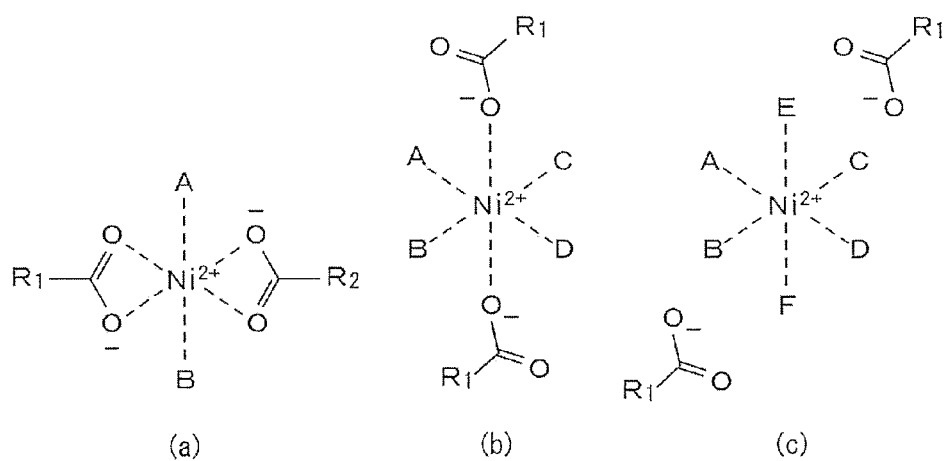
FIG. 1 illustrates the structures of the nickel acetate complexes with (a) bidentate acetate ligands, (b) monodentate acetate ligands and (c) outer acetate ions, respectively.

The embodiments of this invention will be described as follows.

[First Embodiment]

The method for producing nickel nanoparticles of the first embodiment includes first and second steps. The first step includes heating a mixture of a nickel carboxylate (nickel salt of a carboxylic acid) and a primary amine to obtain a complexed reaction solution with a nickel complex formed therein, wherein the nickel carboxylate has 1-12 carbon atoms in its moiety excluding —COOH. The second step includes heating the complexed reaction solution by a microwave to form a Ni-nanoparticle slurry. In this embodiment, the heating in the first step can be conducted at a temperature of 105-175° C., and that in the second step can be conducted at a temperature of 180° C. or higher, preferably 200° C. or higher.

<First Step>

In the first step, a mixture containing a nickel carboxylate and a primary amine is heated to obtain a complexed reaction solution.

(Nickel Carboxylate)

The nickel carboxylate (nickel salt of a carboxylic acid) having 1-12 carbon atoms in its moiety excluding —COOH is not limited in the species of the carboxylic acid, and the carboxylic acid may be, for example, a monocarboxylic acid having one carboxyl group, or a carboxylic acid having two or more carboxyl groups. Moreover, an acyclic carboxylic acid or a cyclic carboxylic acid is also possible. When the carbon number of the moiety of the nickel carboxylate excluding —COOH is less than one (e.g., nickel formate) or more than 12, the particle shape becomes non-uniform, so such cases are not preferred. The carbon number of the moiety of the nickel carboxylate excluding —COOH is preferably 1 to 8. Among such nickel carboxylates, nickel acetate is more preferred. The nickel carboxylate can be a hydrate or an anhydrate. Moreover, the cases using an inorganic salt such as nickel chloride, nickel nitrate, nickel sulfate, nickel carbonate or nickel hydroxide instead of nickel carboxylate has been considered, but the reduction process in such case requires high-temperature heating because the inorganic salt dissociates (decomposes) at a high temperature, so such case is not preferred. Moreover, the case using $Ni(acac)_2$ (β-diketonate complex), or a nickel salt having an organic ligand such as stearate ion, has also been considered, but the cost of the raw materials is high if such a nickel salt is used, so the case is either not preferred.

Moreover, in the method for producing nickel nanoparticles of this embodiment, other kind of nickel carboxylate (e.g., nickel formate) can be used together with the nickel carboxylate (nickel salt of a carboxylic acid) having 1-12 carbon atoms in its moiety excluding —COOH. For example, nickel formate that has a reduction temperature (190-200° C.) lower than that (250° C. or higher) of nickel acetate can be used together to lower the reduction temperature. By lowering the reduction temperature, the side reaction (condensation reaction) of the primary amine can be inhibited. When nickel acetate and nickel formate are used together, the addition proportion of nickel formate relative to the entire nickel acetate is preferably within the range of 5-50 mol %, for example. When nickel founate is used in a proportion within this range, the reduction reaction of the nickel carboxylates can occur at about 200° C.

(Primary Amine)

A primary amine can form a complex with a nickel ion to effectively develop a capability of reducing the nickel complex (or Ni ion). On the other hand, a secondary amine cannot well form a nickel complex due to its high steric hinderance, and a tertiary amine does not have a capability of reducing nickel ion, so both of them cannot be used.

The primary amine is not particularly limited in the species if only it can form a complex with nickel ion, and can have a solid or liquid phase at an ordinary temperature. Hereinafter, the ordinary temperature is defined as 20±15° C. A primary amine as a liquid at an ordinary temperature can also function as an organic solvent in forming the nickel complex. Moreover, there is no particular problem even when a primary amine as a solid at an ordinary temperature is used, if only it can be converted to a liquid by heating at 100° C. or higher or dissolved in an organic solvent.

The primary amine can also function as a dispersant to well disperse the nickel complex in the reaction solution, and therefore can inhibit the inter-particle aggregation when the nickel complex is subjected to thermolysis after its formation to obtain nickel nanoparticles. Although the primary amine may be an aromatic one, it is preferably an aliphatic on in view of easy formation of the nickel complex. An aliphatic primary amine can be adjusted in its carbon chain length, for example, to control the particle sizes of the formed nanoparticles, and is particularly useful when nickel nanoparticles having an average size of 10-150 nm are to be produced. In view of controlling the particle sizes of the nickel nanoparticles, the aliphatic primary amine is suitably selected from those having 6-20 carbon atoms. The particle sizes of the nanoparticles decrease with an increase in the carbon number. Examples of such amines include octylamine, hexadecylamine, dodecylamine, tetradecylamine, stearyl-amine, oleylamine, myristylamine and laurylamine, etc. For example, oleylamine is present in a liquid state at the temperature of the formation process of the nanoparticles, and therefore allows the reaction to run efficiently in the homogeneous solution.

The primary amine also functions as a surface modifier in formation of the nickel nanoparticles, and therefore can inhibit secondary aggregation even after its removal. The primary amine is preferred also in view of the easy operation of the cleaning step for separating the solvent or the unreacted primary amine from the nickel nanoparticles formed as a solid component. Moreover, the primary amine preferably has a boiling point higher than the reduction temperature in view of the reaction controllability when the nickel complex is reduced to obtain nickel nanoparticles. Specifically, the aliphatic primary amine preferably has a boiling point of 180° C. or higher, more preferably 200° C. or higher, and the aliphatic primary amine preferably has a carbon number of 9 or more. For example, $C_9H_{21}N$ (nonylamine) as a $C_9$ aliphatic amine has a boiling point of 201° C. The primary amine preferably has an amount of 2 mol or more, more preferably 2.2 mol or more and even more preferably 4 mol of more, relative to, in terms of metal, 1 mol of the nickel contained in the nickel carboxylate. When the amount of the primary amine is less than 2 mol, the particle sizes of the obtained nickel nanoparticles are difficult to control and have a large variation. Moreover, though the upper limit of the amount of the primary amine is not specified, it is preferably 20 mol or less relative to, in terms of metal, 1 mol of the nickel contained in the nickel carboxylate in view of productivity.

Divalent nickel ion is known to be a species active in ligand substitution, and the complexation may vary because of easy exchange of the ligands of the formed complex due to the temperature and the concentration. For example, in the second step of heating the mixture of the nickel carboxylate and the primary amine to obtain the complexed reaction solution, in consideration of the steric hindrance caused by the carbon chain length and so on of the used amine, a bidentate (a) or monodentate (b) coordination of the carboxylate ions ($R_1COO$ and $R_2COO$) as shown in FIG. 1 is possible, and even the structure (c) with outer carboxylate ions is possible when the amine concentration is in a great excess. For forming a homogeneous solution at the target reaction temperature (reduction temperature), it is necessary that at least one of the positions A, B, C, D E and F is coordinated by a primary amine. To achieve such a state, the primary amine has to be present in excess in the reaction solution, and is preferably present in an amount of 2 mol or more, more preferably 2.2 mol or more and even more preferably 4 mol or more, relative to 1 mol of nickel ion.

(Complexed Reaction Solution)

The complexed reaction solution is the reaction-formed solution (reaction product) formed by the reaction of the nickel carboxylate and the primary amine. Though the complexation reaction can be conducted at room temperature, it is more complete and effective with heating at a temperature of 100° C. or higher. The heating is particularly useful when a nickel carboxylate hydrate such as nickel acetate tetrahydrate is used as the nickel carboxylate. The heating temperature is preferably above 100° C., preferably 105° C. or higher, such that the ligand substitution reaction that the water molecules coordinated to the nickel carboxylate are substituted by the primary amine can run more efficiently, and the water molecules as ligands are dissociated from the complex and even the water is excluded from the system to more efficiently form the target complex. For example, nickel acetate tetrahydrate at room temperature has a complex structure that has two water molecules and two bidentate acetate ions as ligands, and two outer water molecules. Hence, to more efficiently run the complexation reaction where the two water molecule ligands are substituted by the primary amine, it is preferred to heat at a temperature above 100° C. to dissociate the water molecule ligands. Further, the heating temperature is preferably 175° C. or lower, more preferably 105-175° C. and even more preferably 125-160° C., in view of a clear separation from the later thermoreduction process that performs microwave irradiation to the nickel complex (or nickel ion), and completion of the complexation reaction.

The heating time can be properly determined from the heating temperature or the amounts of the respective raw materials, but in view of completion of the complexation reaction, it is preferably 15 minutes or longer. The upper limit of the heating time is not specified, but long-time heating is unnecessary in view of reduction of the energy consumption and the process time. Moreover, the heating method is not particularly limited. For example, a heating method using a heating medium such as an oil bath, or a heating method utilizing microwave irradiation, is applicable.

When the solution obtained by mixing the nickel carboxylate and the primary amine is being heated, the complexation reaction of the nickel carboxylate and the primary amine can be identified by a change of the color of the solution. Moreover, the complexation reaction can be identified by, for example, using a UV-vis absorption spectrometer to measure the absorption spectrum in the wavelength range of 300-750 nm, determining the maximal-absorption wavelength (for example, 710 nm for nickel acetate tetrahydrate) in the absorption spectrum, and observing the shift of the maximal-absorption wavelength of the reaction solution from that of the raw material.

After the complexation of the nickel carboxylate and the primary amine, as described later, the resulting complexed reaction solution is heated through microwave irradiation, such that the nickel ion in the nickel complex is reduced and the carboxylate ion coordinated to the nickel ion decomposes simultaneously, and eventually metallic nickel nanoparticles containing nickel with an oxidation number of zero are formed. In general, nickel carboxylate is insoluble if it is not in a condition with water as a solvent, so it is necessary that the solution containing the nickel carboxylate is a homogeneous reaction solution in the early stage of the heating reduction reaction induced by microwave irradiation. In view of this, the primary amine used in this embodiment is expected to be a liquid at the use temperature and to be liquidized while being coordinated to nickel ion, so as to form a homogeneous reaction solution.

(Organic Solution)

In order to more efficiently run the reaction in a homogeneous solution, it is also possible to further add an organic solvent other than the primary amine. When such organic solvent is used, it is possible to mix the organic solvent, the nickel carboxylate and the primary amine simultaneously, but it is more preferred to add the organic solvent after the nickel carboxylate and the primary amine are mixed and complexed, so as to efficiently coordinate the primary amine to nickel ion. Useful organic solvents are not particularly limited in the species, if only they do not hinder the complexation of the primary amine and nickel ion. For example, an ether-type organic solvent having 4 to 30 carbon atoms, a saturated or unsaturated hydrocarbon-type organic solvent having 7 to 30 carbon atoms, or an alcohol-type organic solvent having 8 to 18 carbon atoms can be used. Moreover, in view of the usability in the heating condition of microwave irradiation, the organic solvent to be used is preferably selected from those having a boiling point of 170° C. or higher, and is more preferably selected from those having a boiling point within the range of 200-300° C. Specific examples of such organic solvents include tetraethylene glycol and n-octylether, etc.

<Second Step>

In this step, the complexed reaction solution is heated by a microwave to a temperature of 180° C. or higher, preferably 200° C. or higher, to reduce the nickel complex (or nickel ion) into metallic nickel and from nickel nanoparticles. When the heating temperature is below 180° C., there is a risk that the reduction reaction of the nickel complex does not run well. By heating the complexed reaction solution with a microwave, uniform heating can be achieved because the microwave can penetrate into the complexed reaction solution, and rapid heating can also be achieved because energy can be provided to the medium directly. By doing so, the entirety of the complexed reaction solution can have a desired temperature uniformly, and the respective processes of the reduction of the nickel complex (or nickel ion), nucleation and nucleus growth can be induced at everywhere of the solution synchronously. As a result, it is easy to produce mono-dispersed particles having a narrow particle-size distribution.

In view of inhibiting the variation of shapes of the obtained nanoparticles, the heating temperature caused by microwave irradiation is preferably 200° C. or higher, more preferably 220° C. or higher. The upper limit of the heating temperature is not specified, but is suitably 270° C. in view of efficiently conducting the treatment. The heating time is not particularly limited, and can be 2 to 10 minutes, for example.

However, in a case where carbonized nickel nanoparticles are to be obtained by a high-temperature heating treatment, the heating temperature caused by the microwave irradiation is preferably in the range of 240-320° C., more preferably in the range of 260-320° C. Moreover, when carbonized nickel nanoparticles are to be obtained, the time of the heating by microwave irradiation, i.e., the reaction time, is preferably longer, preferably 20 minutes or longer, and more preferably about 20 to 60 minutes. Because the carbonized nickel nanoparticle is non-magnetic, it can have higher dispersity than the non-carbonized one. For example, in a case where the nickel nanoparticle is to be used as a conductive paste for use in multilayer ceramic capacitors, if there is much organic substance (a primary amine such as an aliphatic amine) present on the surface of the nickel nanoparticle, there would be no room to add other dispersant, or the effect of the dispersant is lowered. Through a high-temperature heating treatment, the primary amine (aliphatic amine) can be carbonized, so that the amount of the primary amine (aliphatic amine) covering the surface of the nickel nanoparticle can be reduced. Moreover, through a high-temperature microwave heating treatment, the carbonized nickel nanoparticles can be obtained in one pot.

Moreover, the frequency of the microwave used is not particularly limited, and may be 2.45 GHz, for example.

To produce nickel nanoparticles having a uniform particle size, it is necessary that the nickel complex is formed uniformly and sufficiently in the first step (the step for forming the nickel complex) and synchronous generation and growth of nuclei of the zero-valent nickel formed through reduction of the nickel complex (or nickel ion) is carried out in the second step (the step of heating by microwave irradiation). That is, by adjusting the heating temperature of the first step to within the above-defined range and clearly lower than that of the second step, particles having uniform sizes and shape are easy to form. For example, if the heating temperature of the first step is overly high, formation of the nickel complex and the reduction reaction forming zero-valent nickel would occur simultaneously, and it would be difficult to form particles having a uniform shape in the second step. Moreover, if the heating temperature of the second step is overly low, the rate of the reduction reaction forming zero-valent nickel becomes low, so that not only the resulting particles are large due to less generation of nuclei, but also the yield of the nickel nanoparticles is bad.

The nickel nanoparticle can be obtained from the Ni-nanoparticle slurry formed by the microwave-irradiation heating, for example, by placing the slurry still to separate the same, removing the supernatant, cleaning with a suitable solvent, and drying.

In the second step, if required, an aforementioned organic solvent, an alcohol such as octanol (octylalcohol), or a non-polar solvent, etc., can be added in the complexed reaction solution. Moreover, as mentioned above, the primary amine used for the complexation reaction is preferably used as an organic solvent directly.

The method for producing nickel nanoparticles of this embodiment can include arbitrary step other than the above steps. Further, for example, an arbitrary treatment, such as addition of a surface modifier or a carbonization treatment through re-heating as described later, can be conducted. Moreover, because the method for producing nickel nanoparticles of this embodiment adopts a reduction method using microwave heating in the second step for Raining nickel nanoparticles, it is unnecessary to use a large amount of reductant as in Patent Documents 1 and 2. Nevertheless, there is no harm if a material having a reductive effect is present in the complexation reaction solution, if only its amount is within the range that does not degrade the effects of this invention.

(Addition of Surface Modifier)

In the method for producing nickel nanoparticles of this embodiment, a surface modifier can be added to control the particle sizes of the nickel nanoparticle and raise the dispersity of the same. For example, a polymer resin such as polyvinylpyrrolidone (PVP), polyethyleneimine or polyacrylamide, or a long-chain carboxylic acid such as myristic acid or oleic acid, or a carboxylate salt can be added. However, if the surface modification of the obtained nickel nanoparticle is too much, in the application of a conductive paste for use in nickel electrodes, the filling density is decreased when the nickel nanoparticle is calcined at a high temperature to form the paste, and inter-layer peeling or cracks may occur. Hence, the surface modification amount of the obtained nickel nanoparticles after the cleaning is preferably as small as possible, so the addition amount of the surface modifier is preferably within the range of 0.1-100 parts by mass relative to, in terms of metal, 100 parts by mass of nickel. Although the surface modifier may be added in the mixture of the nickel carboxylate and the primary amine in the first step or in the complexed reaction solution obtained by the first step, the timing of the addition is preferably after the complexation reaction or after formation of the nickel nanoparticles.

(Carbonization Treatment through Re-Heating)

The method for producing nickel nanoparticles of this embodiment may include a step of placing the obtained nickel nanoparticle into a primary amine and then heating the same together with the primary amine to form carbonized nickel nanoparticles. In this step, the primary amine used can be the same as above. The reheating temperature can be 240° C. or higher, for example, and is preferably within the range of 260-320° C. Moreover, the reheating time is, for example, preferably 20 minutes or longer and more preferably about 20-60 minutes. The heating method of the reheating is not particularly limited, and may be one using a mantle heater or an oil bath, or one utilizing microwave irradiation. Because such obtained carbonized nickel nanoparticle is non-magnetic, it can have a higher dispersity than the magnetic nickel nanoparticle. Moreover, with the reheating, the amount of the primary amine (aliphatic amine) covering the surfaces of the nickel nanoparticles can be reduced. For example, in a case where the nickel nanoparticles are used as a conductive paste for use in multilayer ceramic capacitors, if there is much organic substance (a primary amine such as an aliphatic amine) present on the surfaces of the nickel nanoparticles, there would be no room to add other dispersant, or the effect of the dispersant would be lowered. With the high-temperature heating treatment, the primary amine (aliphatic amine) can be carbonized, and the amount of the primary amine (aliphatic amine) covering the surfaces of the nickel nanoparticles can be reduced.

<Nickel Nanoparticle>

By using the method for producing nickel nanoparticles of this embodiment as described above, nickel nanoparticles having an average particle size of possibly 150 nm or less and preferably about 10-150 nm, uniform particle sizes, and particularly a high dispersity can be obtained. Moreover, the average particle size mentioned in this specification is defined as the area-averaged particle size of 200 nanoparticles that are randomly selected from a photograph of a SEM image of the nanoparticle powder.

The nickel nanoparticles obtained in this embodiment may have various shapes, such as spherical shape, pseudo-spherical shape, ellipsoidal shape, cubic shape, truncated tetrahedral shape, bipyramid shape, regular octahedral shape, regular decahedral shape and regular icosahedral shape, etc., but in view of increasing the filling density in, for example, a case where the nickel nanoparticle is used in electrodes of electronic components, the spherical shape or pseudo-spherical shape is preferred, and the spherical shape is more preferred. Herein, the shape of the nanoparticles can be identified by observing them using a scanning electron microscope (SEM).

Such nanoparticle can be utilized to form electrodes and the like of electronic components, which start at, e.g., the internal electrode materials of multilayer ceramic capacitors.

As mentioned above, by using the method for producing nickel nanoparticles of this embodiment, nickel nanoparticles with a uniform particle size and a good dispersity can be produced easily based on a liquid-phase reaction without using a large amount of reductant.

[Second Embodiment]

The method for producing nickel nanoparticles of the second embodiment of this invention is described as follows. In a case where the nickel nanoparticle is mixed in a conductive paste used through ink-jet discharge, for example, the nickel nanoparticle is expected to have a smaller particle size, which is preferably controlled at 50 nm or less. The method for producing Ni nanoparticles of this embodiment includes a first step and a second step. The first step includes heating a mixture of a nickel carboxylate and a primary amine to obtain a complexed reaction solution with a nickel complex formed therein, wherein the nickel carboxylate has 1-12 carbon atoms, preferably 1 or 2 carbon atoms, in its moiety excluding —COOH. The second step includes heating the complexed reaction solution by microwave to form a Ni-nanoparticle slurry. Moreover, between the first step and the second step there is a metal-salt addition step, in which one, two or more metal salts selected from the group consisting of palladium salts, silver salts, platinum salts and gold salts are added in the complexed reaction solution. Hereafter, this embodiment will be described focusing on its differences from the first embodiment, and the same constitutions as in the first embodiment are not described.

<First Step>

(Nickel Carboxylate)

The nickel carboxylate used in this embodiment can be the same as that used in the first embodiment, but is preferably one having a straight chain of 1 or 2 carbon atoms as its moiety excluding —COOH. Specifically, such nickel carboxylate can be exemplified by nickel acetate or nickel propionate. Any of these nickel carboxylates may be an anhydrate, or may be a hydrate.

(Primary Amine)

The primary amine used in this embodiment can be the same as that used in the first embodiment.

(Complexed Reaction Solution)

The complexed reaction solution in this embodiment is the same as that in the first embodiment, except that a nickel carboxylate having a straight chain of 1 or 2 carbon atoms as its moiety excluding —COOH is preferably used as the nickel carboxylate.

<Metal-Salt Addition Step>

In this step, one, two or more metal salts selected from the group consisting of palladium salts, silver salts, platinum salts and gold salts are added in the complexed reaction solution. By adding the metal salt(s), it is possible to form a large amount of nuclei as the starting sites of nickel nanoparticles in the subsequent nickel nanoparticle formation step, so that the particle size of the target nickel nanoparticles can be reduced. Any of the metal salts is not particularly limited in the type thereof The acids (acid group) for forming the salts include hydrochloric acid, nitric acid, sulfuric acid and acetic acid, in preferred embodiments. The platinum salt or gold salt used here is, for example, chloroplatinic acid or chloroauric acid, in preferred embodiments.

The amount of the metal salt added in the complexed reaction solution is not particularly limited, but is preferably set such that, in terms of metal, the amount of the metal in the metal salt is 0.01 part by mass or more relative to 100 parts by mass of the nickel contained in the nickel carboxylate. The upper limit of the amount of the metal salt is not specified, but in consideration of the balance between the effect of this invention and the cost, the metal salt is preferably added in a manner such that, in terms of metal, the amount of the metal in the metal salt is 10 or less parts by mass relative to 100 parts by mass of the nickel contained in the nickel carboxylate. In another viewpoint, the metal salt is preferably added in an amount of 0.01-10 mol relative to, in terms of metal, 100 mol of the nickel contained in the nickel carboxylate.

(Second Step)

This step includes heating, by a microwave, the complexed reaction solution added with the metal salt, so as to reduce the nickel complex (or nickel ion) to metallic nickel and form nickel nanoparticles. In this step, with the metal salt added in the complexed reaction solution, a great number of fine metal particles of palladium, silver, platinum or gold are formed first due to the redox voltage difference from nickel. Then, metallic nickel is form around the fine metal particles that serve as nuclei, and it is considered easy to form nickel nanoparticles having a particle size of 50 nm or less. The second step (for forming nickel nanoparticles) of this embodiment is similar to the second step (for forming nickel nanoparticles) of the first embodiment, except that a complexed reaction solution added with a metal salt is used instead.

<Nickel Nanoparticles>

By using the method for producing nickel nanoparticles of this embodiment as described above, nickel nanoparticles can be obtained with an average particle size of 50 nm or less, preferably within the range of 10-45 mu and more preferably within the range of 20-40 nm. Such nickel nanoparticles can be suitably applied to certain uses such as conductive pastes used by ink-jet discharge, catalysts with a large surface area, metal binders utilizing a low melting point, pigments used in a black matrix or the like, and so on. Such nanoparticles can be applied to the formation of the electrodes and the like of electronic components, which start at, for example, the internal electrodes of multilayer ceramic capacitors.

Other constitutions and effects of this embodiment are similar to those of the first embodiment.

[Third Embodiment]

The method for producing nickel nanoparticles of the third embodiment of this invention includes a first step and a second step. The first step includes heating a mixture of a nickel carboxylate and a primary amine to obtain a complexed reaction solution with a nickel complex formed therein, wherein the nickel carboxylate has 1-12 carbon atoms in its moiety excluding —COOH. The second step includes heating the complexed reaction solution by microwave to foam a Ni-nanoparticle slurry. Moreover, the heating in the second step is conducted in a state that a multi-valent carboxylic acid of 3 or more valences is present in the complexed reaction solution. Hereafter, this embodiment will be described focusing on its differences from the first embodiment, and the same constitutions as in the first embodiment are not described.

(Multi-Valent Carboxylic Acid)

The multi-valent carboxylic acid of 3 or more valences used in the method for producing nickel nanoparticles of this embodiment is described below. The multi-valent carboxylic acid having a valence number (the number of carboxyl groups in one molecule) of 3 or more, which is imply called "the multi-valent carboxylic acid" in this specification, functions as a dispersant. The multi-valent carboxylic acid develops a high dispersity that can prevent aggregation when the complexed reaction solution is heated to form nickel nanoparticles, and can prevent aggregation of nickel nanoparticles when the produced nickel nanoparticles are used in a desired application. The multi-valent carboxylic acid is not particularly specified, and may be an acyclic carboxylic acid, or a cyclic carboxylic acid. Among these carboxylic acids, the acyclic carboxylic acids are preferred. When the valence number of the multi-valent carboxylic acid is 2 or less, there is a risk that a good dispersion is not obtained. The upper limit of the valence number is not specified, but is preferably set to 8 because a large valence number causes a large molecular weight and a high boiling point.

The multi-valent carboxylic acid can be added, at least before the heating of the second step, in the stage of preparing the mixture, in the mixture, or in the complexed reaction solution. The multi-valent carboxylic acid is preferably added in an amount of 3 or more parts by mass relative to, in terms of metal, 100 parts by mass of the nickel contained in the nickel carboxylate. When the amount of the multi-valent carboxylic acid is less than 3 parts by mass, the effect of its addition is insufficient. On the other hand, the upper limit of the amount of the multi-valent carboxylic acid is not specified. However, when the amount exceeds 25 parts by mass relative to 100 parts by mass of nickel, the effect of its addition reaches the maximum, and such a case is not preferred in view of the cost.

<First Step>
(Nickel Carboxylate)

The nickel carboxylate used in this embodiment can be the same as that used in the first embodiment.

(Primary Amine)

The primary amine used in this embodiment can be the same as that used in the first embodiment.

(Complexed Reaction Solution)

The complexed reaction solution used in this embodiment is similar to that used in the first embodiment, except being added with the multi-valent carboxylic acid. That is, in this embodiment, the complexed reaction solution further contains the multi-valent carboxylic acid, together with the nickel carboxylate and the primary amine.

<Second Step>

The second step in this embodiment can be conducted in the same manner as in the first embodiment, except that the complexed reaction solution is heated by a microwave in a state of further containing the multi-valent carboxylic acid.

<Nickel Nanoparticles>

With the method for producing Ni nanoparticles of this embodiment as described above, nickel nanoparticles having an average particle size of about 10-150 nm, uniform particle sizes and particularly a high dispersity can be obtained. Such Ni-nanoparticles can be applied to the formation of electrodes and the like of electronic components, which start at, for example, internal electrode materials of multilayer ceramic capacitors.

As mentioned above, by using the method for producing nickel nanoparticles of this embodiment, nickel nanoparticles with uniform particle sizes and a good dispersity can be produced easily based on a liquid-phase reaction without using a large amount of reductant.

Other constitutions and effects of this embodiment are similar to those of the first embodiment.

[Fourth Embodiment]

The method for producing nickel nanoparticles of the fourth embodiment of this invention is for producing metal-compounded nickel nanoparticles containing a metal having a melting point higher than that of nickel, which is simply called "refractory metal" hereafter. The method for producing nickel nanoparticles of this embodiment includes a first step and a second step. The first step includes heating a mixture of a nickel carboxylate and a primary amine to obtain a complexed reaction solution with a nickel complex formed therein, wherein the nickel carboxylate has 1-12 carbon atoms in its moiety excluding —COOH. The second step includes heating the complexed reaction solution by a microwave to form a Ni-nanoparticle slurry. Moreover, at least before the microwave irradiation, a salt of refractory metal is added in the stage of preparing the mixture, or added in the mixture or in the complexed reaction solution, and then the microwave heating is conducted to form nickel nanoparticles compounded with the refractory metal. Hereafter, this embodiment will be described focusing on its differences from the first embodiment, and the same constitutions as in the first embodiment are not described.

(Salt of Refractory Metal)

The salt of refractory metal used in the method for producing Ni-nanoparticles of this embodiment is described first. The refractory metal is a metal having a melting point equal to or higher than that (1455° C.) of nickel, and can be exemplified by tungsten, molybdenum, vanadium, niobium and so on. Though the salt of such refractory metal may be a tungsten salt, a molybdenum salt, a vanadium salt or a niobium salt, etc., the tungsten salt or molybdenum salt is preferably used, and the tungsten salt is more preferred. The salts of refractory metal used here are preferably halides, wherein chlorides are more preferred. The salts of refractory metal may be used alone for each, or may be used in a combination of two or more thereof.

The salt of refractory metal can be added before the microwave irradiation. For example, it may be mixed with the nickel carboxylate and the primary amine to form a mixture. Moreover, it may be added in a mixture that has been prepared without adding. Or, it may be added, directly before the microwave heating is conducted, in the complexed reaction solution that is formed by heating a mixture prepared without adding it. When the salt of refractory metal is a tungsten salt, due to its solubility in the reaction solution and its higher reactivity in the compounding reaction with nickel, it is suitably added together with the nickel carboxylate and the primary amine to form a mixture. By doing so, the tungsten salt easily forms an amine complex with the primary amine. By using a salt of refractory metal together with the nickel carboxylate, the produced nickel nanoparticles are metal-compounded particles, which have a higher sintering temperature than those produced without using a salt of refractory metal.

The content of the refractory metal in the metal-compounded nickel nanoparticle can be controlled by the amount of the salt of refractory metal being used. The salt of refractory metal is suitably added in a manner such that, in terms of metal, the amount of the refractory metal is 0.05 to 30 parts by mass, preferably 1 to 30 parts by mass, relative to 100 parts by mass of the nickel contained in the nickel carboxylate. When the amount of the refractory metal in the salt of refractory metal is 0.05 part by mass or more relative to 100 parts by mass of the nickel contained in the nickel carboxylate, a certain degree of the effect of raising the sintering temperature is identified. However, when the amount is below 1 part by mass, the effect of raising the sintering temperature may be insufficient. On the other hand, when the amount exceeds 30 parts by mass, the cost becomes high. Moreover, the particle sizes of the metal-compounded nickel nanoparticles are remarkably not uniform. Or, the thermal expansion is large when the metal-compounded nickel nanoparticles are sintered, so there is a risk that inter-layer peeling or cracks occur, for example, in applications of multilayer ceramic capacitors.

<First Step>

In this embodiment, the complexed reaction solution can be prepared, in the first step, by any of the following methods:

A) a method of mixing the salt of refractory metal together with the nickel carboxylate and the primary amine to prepare a mixture and heating the mixture to obtain a complexed reaction solution;

B) a method of mixing the nickel carboxylate and the primary amine without the salt of refractory metal to prepare a mixture and heating the mixture to obtain a complexed reaction solution;

C) a method of mixing the nickel carboxylate and the primary amine without the salt of refractory metal to prepare a mixture, mixing the salt of refractory metal in the mixture, and then heating the mixture to obtain a complexed reaction solution;

D) a method of preparing and heating a mixture of the nickel carboxylate and the primary amine and a mixture of the salt of refractory metal and the primary amine, respectively, to form respective complexed reaction solutions, and mixing them.

Among the above methods A-D, the method A is more preferred, because it can finish the complexation reaction of the nickel carboxylate, the salt of refractory metal and the primary amine in one pot to obtain a complex of nickel and the refractory metal in a high yield. In the case of the method B, because only the nickel carboxylate and the primary amine are used to prepare the complexed reaction solution, it is necessary to add the salt of refractory metal in the complexed reaction solution thereafter. In the case of the method C, because the salt of refractory metal is added in the mixture before the heating, it is possible to form a complex from the refractory metal. Therefore, the method C is preferred than the method B. In the method D, because a complexed reaction solution containing the nickel complex and a complexed reaction solution containing the complex of the refractory metal are prepared respectively, the complex can be obtained in a high yield. Herein, the so-called complexed reaction solution is a reaction-produced solution (reaction product) formed by the reaction of the nickel carboxylate and/or the salt of refractory metal with the primary amine.

(Nickel Carboxylate)

The nickel carboxylate used in this embodiment can be the same as that used in the first embodiment.

(Primary Amine)

The primary amine used in this embodiment can be the same as that used in the first embodiment. Moreover, because the ion of the refractory metal has a behavior similar to nickel ion as described in the first embodiment, it is considered to form a complex with the primary amine. Therefore, it is preferred that the primary amine is present in an excess amount relative to the ion of the refractory metal.

<Second Step>

In this step, the complexed reaction solution is irradiated by a microwave and thus heated to a temperature of 200° C. or higher to foal' metal-compounded nickel nanoparticles containing the refractory metal. Moreover, as described above, in this step, the salt of refractory metal can be added in the complexed reaction solution directly before the microwave heating, for example.

In this embodiment, optimization of the magnitude and the distribution of the particle sizes of the metal-compounded nickel nanoparticles can be attempted. Besides, by containing the refractory metal, metal-compounded nickel nanoparticles particularly having a high sintering temperature can be obtained. Metal-compounded nickel nanoparticles having a high sintering temperature can be suitably used as the material of the internal electrodes of multilayer ceramic capacitors. Moreover, the "sintering temperature" means, when the nickel nanoparticles are heated, the temperature at which inter-particle binding is generated to form a dense solid, and is lower than the melting point. Herein, because a precise measurement of the sintering temperature is difficult, in the examples described later, the raise of the sintering temperature was derived from the behavior of thermal expansion/shrinkage of the nanoparticles, which was measured from a molded piece obtained by press-molding the nickel nanoparticles, by using a thermal mechanical analyzer (TMA), in an atmosphere of a nitrogen gas containing 2% of hydrogen gas.

<Metal-Compounded Nickel Nanoparticles>

The metal-compounded nickel nanoparticle obtained in this embodiment contains a refractory metal such as tungsten, molybdenum, vanadium or niobium, etc. In terms of metal, the metal-compounded nickel nanoparticle contains the refractory metal in an amount of 0.05-30 parts by mass, preferably 1-30 parts by mass, relative to 100 parts by mass of nickel. If the proportion of the refractory metal in the metal-compounded nickel nanoparticle is overly small, it is difficult to sufficiently raise the sintering temperature of the nanoparticles. On the other hand, if the proportion of the refractory metal is overly large, the particle sizes of the nanoparticles are remarkably non-uniform. Hence, metal-compounded nickel nanoparticles having particularly large particle sizes are present, and, for example in applications of multilayer ceramic capacitors, there is a risk that the ceramic dielectric layer is penetrated so that the internal electrodes are connected with each other to cause a short circuit.

The average size of the metal-compounded nickel nanoparticles, in cases of the applications of the electrode materials and the like of electronic components that start at, for example, the internal electrodes of multilayer ceramic capacitors, is preferably within the range of 10-150 nm, more preferably within the range of 10-120 nm.

Moreover, because a sharp particle-size distribution is a more preferred mode, the CV value (variation coefficient) of the metal-compounded nickel nanoparticles is 0.4 or less, preferably 0.3 or less and more preferably 0.2 or less. Herein, the CV value is an index indicating relative scattering, and a smaller CV value means a sharper particle-size distribution. Further, the CV value is calculated by dividing the standard deviation of the particle sizes by the average particle size.

As described above, with the method for producing metal-compounded nickel nanoparticles of this embodiment, it is possible to obtain nickel nanoparticles that have an average particle size of about 10-150 nm and uniform particle sizes and particularly have a higher sintering temperature than the conventional nickel nanoparticles.

Other constitutions and effects of this embodiment can be the same as those of the first embodiment.

[Fifth Embodiment]

The method for producing nickel nanoparticles of the fifth embodiment of this invention produces metal-compounded nickel nanoparticles containing a refractory metal. The method for producing nickel nanoparticles of this embodiment includes a first step and a second step. The first step includes heating a mixture of a nickel carboxylate and a primary amine to obtain a complexed reaction solution with a nickel complex formed therein, wherein the nickel carboxylate has 1-12 carbon atoms in its moiety excluding —COOH. The second step includes heating the complexed reaction solution by a microwave to form a Ni-nanoparticle slurry. Moreover, the method includes a third step that includes, after the Ni-nanoparticle slurry is obtained by the second step, mixing a salt of refractory metal in the slurry and heating the slurry by microwave irradiation to form nickel nanoparticles compounded with a refractory metal. Hereafter, this embodiment will be described focusing on its differences from the first embodiment, and the same constitutions as in the first embodiment are not described.

<First Step>

(Nickel Carboxylate)

The nickel carboxylate used in this embodiment can be the same as that used in the first embodiment, but is preferably one having a straight chain of 1 or 2 carbon atoms as its moiety excluding —COOH. Specifically, such nickel carboxylate can be exemplified by nickel acetate or nickel propionate. Any of these nickel carboxylates may be an anhydrate, or may be a hydrate.

(Primary Amine)

The primary amine used in this embodiment can be the same as that used in the first embodiment.

(Complexed Reaction Solution)

The complexed reaction solution in this embodiment is the same as that in the first embodiment.

(Organic Solvent)

Because the reaction runs more efficiently in a homogeneous solvent, an organic solvent other than the primary amine may be added additionally. The organic solvent used in this embodiment can be the same as that used in the first embodiment.

<Second Step>

The second step in this embodiment can be conducted in the same manner as that in the first embodiment.

<Third Step>

(Salt of Refractory Metal)

The salt of refractory metal used in this embodiment can be the same as that used in the fourth embodiment. Moreover, for example, it is possible to directly mix the salt of refractory metal in the Ni-nanoparticle slurry, or to firstly mix the same with a primary amine to prepare a mixture and then mix the mixture in the Ni-nanoparticle slurry. In order to increase the solubility of the salt of refractory metal in the reaction solution and the reactivity in the compounding reaction with nickel, it is preferred to mix, with the Ni-nanoparticle slurry, a mixture previously prepared with the salt of refractory metal and a primary amine, and more preferred to heat a mixture previously prepared with the salt of refractory metal and the primary amine into the state of complexed reaction solution and then mix the same with the Ni-nanoparticle slurry. Moreover, in such a case, the complexed reaction solution of the salt of refractory metal and the primary amine can be prepared in the same condition as in the preparation of the complexed reaction solution in the first step. The salt of refractory metal will be reduced on the surfaces of the nickel nanoparticles by the subsequent heating with microwave irradiation, so the obtained nickel nanoparticles are metal-compounded and can have a higher sintering temperature than those produced without using a salt of refractory metal. Moreover, the heating with microwave irradiation can be conducted in the same manner as in the first embodiment.

In this embodiment, optimization of the magnitude and the distribution of the particle sizes of the metal-compounded nickel nanoparticles can be attempted. Besides, by containing the refractory metal, metal-compounded nickel nanoparticles particularly having a high sintering temperature can be obtained. Metal-compounded nickel nanoparticles having a high sintering temperature can be suitably used as a material of the internal electrodes of multilayer ceramic capacitors.

<Metal-Compounded Nickel Nanoparticles>

The metal-compounded nickel nanoparticle obtained in this embodiment contains a refractory metal such as tungsten, molybdenum, vanadium or niobium, etc. In terms of metal, the metal-compounded nickel nanoparticle contains the refractory metal in an amount of 0.05-30 parts by mass, preferably 1-30 parts by mass, relative to 100 parts by mass of nickel. If the proportion of the refractory metal in the metal-compounded Ni nanoparticle is overly small, it is difficult to sufficiently raise the sintering temperature of the nanoparticles. On the other hand, if the proportion of the refractory metal is overly large, the particle sizes of the nanoparticles become remarkably non-uniform. Hence, metal-compounded nickel nanoparticles having particularly large particle sizes are present, and, for example in applications of multilayer ceramic capacitors, there is a risk that the ceramic dielectric layer is penetrated so that the internal electrodes are connected with each other to cause a short circuit.

The average size of the metal-compounded nickel nanoparticles, in the cases of the applications of the electrode materials and the like of electronic components that start at, for example, internal electrodes of multilayer ceramic capacitors, is preferably within the range of 10-150 nm, more preferably within the range of 10-120 nm.

Moreover, because a sharp particle-size distribution is a more preferred mode, the CV value (variation coefficient) of the metal-compounded nickel nanoparticles is 0.4 or less, preferably 0.3 or less and more preferably 0.2 or less.

As described above, with the method for producing metal-compounded nickel nanoparticles of this embodiment, it is possible to obtain nickel nanoparticles that have an average particle size of about 10-150 nm and uniform particle sizes an particularly have a higher sintering temperature than conventional nickel nanoparticles.

Other constitutions and effects of this embodiment are the same as those in the first embodiment.

EXAMPLES

This invention will be further explained with the Examples and Comparative Examples provided below, but is not limited to the Examples as described below.

With respect to the particle sizes of the nickel nanoparticles, the particle sizes of 200 nanoparticles that were randomly selected from a photograph of a SEM (scanning electron microscope) image of the nanoparticle powder were measured, and their average value and standard deviation were calculated.

The CV value (variation coefficient) can be calculated by dividing the standard deviation by the average particle size, and a smaller CV value means that the particle sizes are more uniform.

Example 1-1

20.02 g of nickel acetate tetrahydrate was added in 128.4 g of oleylamine, and the mixture was heated at 130° C. for 20 minutes under a nitrogen flow to dissolve the nickel acetate and obtain a complexed reaction solution 1. Then, oleylamine was further added in the complex reaction solution 1 in an amount of 98.4 g, and a microwave was used to heat the solution at 250° C. for 5 minutes to obtain a Ni-nanoparticle slurry 1.

After the Ni-nanoparticle slurry 1 was placed still to be separated, the supernatant was removed, toluene and methanol were each used to clean the product three times, and then the product was dried by a vacuum dryer maintained at 60° C. for 6 hours to obtain nickel nanoparticles 1.

Figure 2:
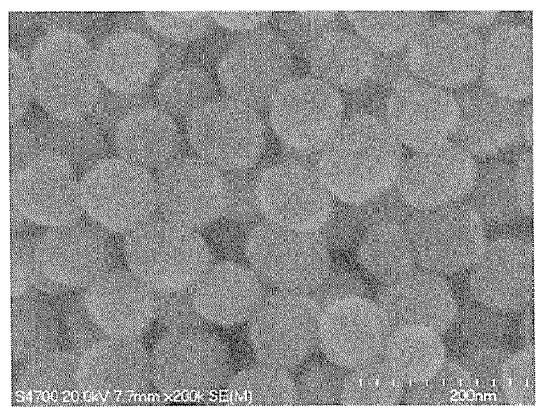
FIG. 2 shows a SEM image of the nickel nanoparticles obtained in Example 1-1.

The SEM (scanning electron microscope) image of the nickel nanoparticles 1 is shown in FIG. 2. It is known from FIG. 2 that uniform particles having a spherical shape and an average particle size of 100 nm were foamed.

Example 1-2

A complexed reaction solution 2 was obtained as in Example 1-1. Then, 98.4 g of tetraethylene glycol was added in the complexed reaction solution 2, and a microwave was used to heat the solution at 250° C. for 5 minutes to obtain a Ni-nanoparticle slurry 2.

After the Ni-nanoparticle slurry 2 was placed still to be separated, the supernatant was removed, toluene was used to clean the product three times, and then the product was dried by a vacuum dryer maintained at 60° C. for 6 hours to obtain nickel nanoparticles 2.

Figure 3:
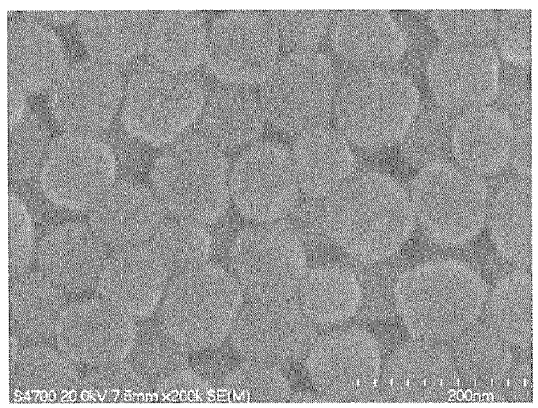
FIG. 3 shows a SEM image of the nickel nanoparticles obtained in Example 1-2.

A SEM image of the nickel nanoparticles 2 is shown in FIG. 3. It is known from FIG. 3 that uniform particles having a spherical shape and an average particle size of 80 nm were formed.

Example 1-3

A complexed reaction solution 3 was obtained as in Example 1-1. Then, 98.4 g of 1-octanol was added in the complexed reaction solution 3, and a microwave was used to heat the solution at 210° C. for 5 minutes to obtain a Ni-nanoparticle slurry 3.

After the Ni-nanoparticle slurry 3 was placed still to be separated, the supernatant was removed, methanol was used to clean the product three times, and then the product was dried by a vacuum dryer maintained at 60° C. for 6 hours to obtain nickel nanoparticles 3.

Figure 4:
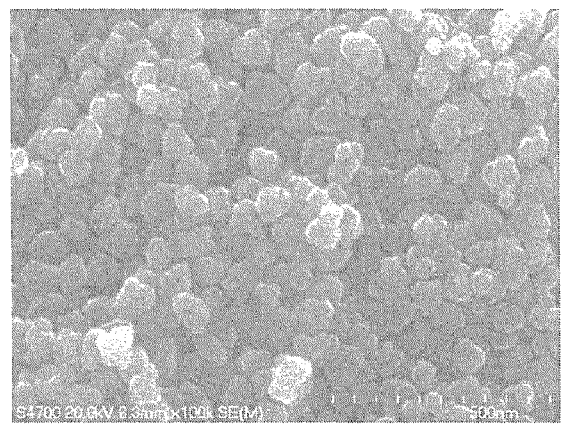
FIG. 4 shows a SEM image of the nickel nanoparticles obtained in Example 1-3.

A SEM image of the nickel nanoparticles 3 is shown in FIG. 4. It is known from FIG. 4 that uniform particles having a pseudo-spherical shape and an average particle size of 51 nm were formed.

Example 1-4

A complexed reaction solution 4 was obtained as in Example 1-1, except that 15.30 g of nickel benzoate was used instead of the 20.02 g of nickel acetate tetrahydrate used in Example 1-1. Then, 200 g of 1-octanol was added in the complexed reaction solution 4, and a microwave was used to heat the solution at 210° C. for 5 minutes to obtain a Ni-nanoparticle slurry 4.

After the Ni-nanoparticle slurry 4 was placed still to be separated, the supernatant was removed, methanol was used to clean the product three times, and then the product was dried by a vacuum dryer maintained at 60° C. for 6 hours to obtain nickel nanoparticles 4.

Figure 5:
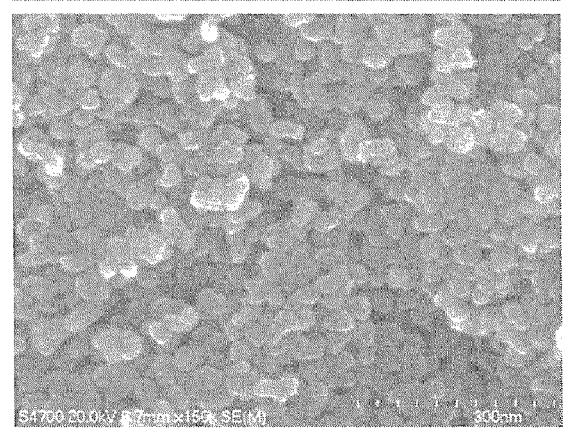
FIG. 5 shows a SEM image of the nickel nanoparticles obtained in Example 1-4.

A SEM image of the nickel nanoparticles 4 is shown in FIG. 5. It is known from FIG. 5 that uniform particles having a pseudo-spherical shape and an average particle size of 30 nm were formed.

Table 1 shows the particle sizes and so on of the nickel nanoparticles of Comparative Examples 1-1, 1-2, 1-3 and 1-4 that were prepared in the same condition of Example 1-3 except that the species of the nickel salt was changed, and also shows those of Examples 1-1, 1-3 and 1-4. In Comparative Examples 1-1 and 1-2 using a nickel salt other than the nickel carboxylate, deformed nanoparticles were obtained. In Comparative Example 1-3, it was known that the nickel ion was not reduced and nanoparticles were not obtained.

TABLE 1

| Nickel Salt | Average Particle Size (nm) | CV | Particle Shape |
|---|---|---|---|
| Nickel acetate (Example 1-1) | 100 | 0.12 | Spherical |
| Nickel acetate (Example 1-3) | 51 | 0.18 | Pseudo-spherical |
| Nickel benzoate (Example 1-4) | 30 | 0.25 | Pseudo-spherical |
| Nickel stearate (Comparative Example 1-1) | 10-100 | | Needle |
| Nickel acetylacetonate (Comparative Example 1-2) | 30-150 | | Needle |
| Nickel chloride (Comparative Example 1-3) | — | — | — |
| Nickel formate (Comparative Example 1-4) | 60 | 0.18 | Mixture of spheres and plates |

Table 2 shows the particle sizes and the CV values of the nickel nanoparticles prepared in the same condition of Example 1-1 except that the formation temperature of the reaction solution, and the maintaining time after the reaction solution reached the formation temperature were changed. In Table 2, the cases wherein the yield of nickel nanoparticles is below 30% are marked by solid circles (●). Moreover, the yield of the nickel nanoparticles obtained in the reaction condition of any case with the information of the average particle size is 95% or more. It is known from Table 2 that in order to obtain suitable particle sizes and uniformity of particle sizes, the formation temperature of the reaction solution is preferably within the range of 105-175° C.

TABLE 2

| | | Maintaining time (min) after the reaction solution reached the formation temperature | | |
|---|---|---|---|---|
| | | 10 | 20 | 240 |
| Formation temperature (° C.) of the reaction solution | 100 | ● | | |
| | 110 | | Average particle size: 150 CV: 0.35 | Average particle size: 140 CV: 0.28 |
| | 120 | ● | Average particle size: 145 CV: 0.29 | Average particle size: 145 CV: 0.26 |
| | 130 | | Average particle size: 100 CV: 0.17 | Average particle size: 80 CV: 0.21 |
| | 140 | | Average particle size: 100 CV: 0.17 | Average particle size: 59 CV: 0.27 |
| | 150 | | Average particle size: 90 CV: 0.18 | Average particle size: 60 CV: 0.26 |
| | 170 | | Average particle size: 147 CV: 0.31 | Average particle size: 160 CV: 0.36 |

Table 3 shows the particle sizes and so on of the nickel nanoparticles prepared in the same condition of Example 1-1 except that the formation temperature of the nickel nanoparticles was changed. It is known therefrom that nickel nanoparticles were not foiiiied when the temperature was 150° C.

TABLE 3

| Formation temperature (° C.) of Ni-nanoparticles | Average Particle Size (nm) | CV |
|---|---|---|
| 150 | No reaction | |
| 200 | 50 | 0.18 |
| 210 | 51 | 0.17 |
| 240 | 49 | 0.18 |
| 250 | 48 | 0.18 |

The particle size and so on of the modified Example 1-3 where the heating utilizes an oil bath instead of microwave and those of Example 1-3 are shown in Table 4. It is known from Table 4 that nickel nanoparticles having sufficiently small particle sizes were not obtained by oil-bath heating.

TABLE 4

| Heating method | Average particle size (nm) | CV |
|---|---|---|
| Microwave | 51 | 0.18 |
| Oil-bath | 300 | 0.18 |

Example 1-5

8.7 g of nickel acetate tetrahydrate was added in 64.87 g of dodecylamine, and the mixture was heated at 120° C. for 15 minutes under a nitrogen flow to dissolve the nickel acetate and obtain a complexed reaction solution 5. Then, a microwave was used to heat the solution at 240° C. for 10 minutes to obtain a Ni-nanoparticle slurry 5.

After the Ni-nanoparticle slurry 5 was placed still to be separated, the supernatant was removed, toluene and methanol were each used to clean the product three times, and then the product was dried by a vacuum dryer maintained at 60° C. for 6 hours to obtain uniform nickel nanoparticles 5 having a spherical shape and an average particle size of 100 nm.

Example 1-6

18.00 g of nickel acetate tetrahydrate and 1.47 g of nickel formate dihydrate were added in 128.4 g of oleylamine, and the mixture was heated at 130° C. for 20 minutes under a nitrogen flow to dissolve the nickel acetate and obtain a complexed reaction solution 6, wherein the mixing ratio of nickel acetate to nickel formate is 9:1 (molar ratio). Then, oleylamine was further added in the complex reaction solution 6 in an amount of 98.4 g, and a microwave was used to heat the solution at 200° C. for 20 minutes to obtain a Ni-nanoparticle slurry 6.

After the Ni-nanoparticle slurry 6 was placed still to be separated, the supernatant was removed, toluene and methanol were each used to clean the product three times, and then the product was dried by a vacuum dryer maintained at 60° C. for 6 hours to obtain nickel nanoparticles 6.

Figure 6:
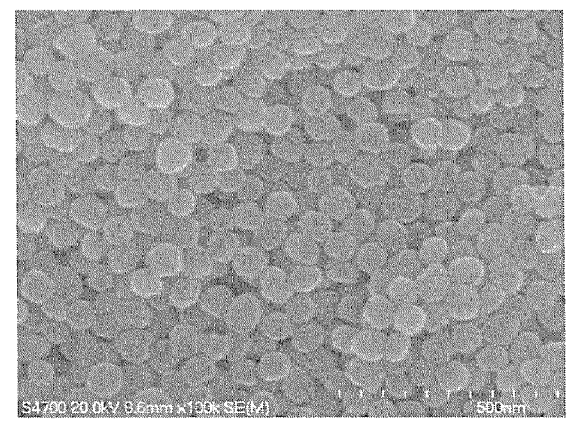
FIG. 6 shows a SEM image of the nickel nanoparticles obtained in Example 1-6.

A SEM image of the obtained nickel nanoparticles 6 is shown in FIG. 6. It is known from FIG. 6 that uniform particles having a pseudo-spherical shape and an average particle size of 60 nm were foamed.

Example 1-7

6.71 g of nickel acetate tetrahydrate and 0.55 g of nickel formate dihydrate were added in 55.6 g of dodecylamine, and the mixture was heated at 120° C. for 15 minutes under a nitrogen flow to dissolve the nickel acetate and obtain a complexed reaction solution 7, wherein the mixing ratio of nickel acetate to nickel formate was 9:1 (molar ratio). Then, a microwave was used to heat the solution at 200° C. for 30 minutes to obtain a Ni-nanoparticle slurry 7.

After the Ni-nanoparticle slurry 7 was placed still to be separated, the supernatant was removed, toluene and methanol were each used to clean the product three times, and then the product was dried by a vacuum dryer maintained at 60° C. for 6 hours to obtain 1.76 g of nickel nanoparticles 7 in a yield of 98.8%.

Example 1-8

Nickel nanoparticles 8 were obtained by the same operation as in Example 1-7, except that 5.23 g of nickel acetate tetrahydrate and 1.66 g of nickel formate dihydrate were used instead of 6.71 g of nickel acetate tetrahydrate and 0.55 g of nickel formate dihydrate. More specifically, a complexed reaction solution 8 was obtained as in Example 1-7 and heated by a microwave to obtain a Ni-nanoparticle slurry 8, and then toluene/methanol cleaning and drying were conducted to obtain 1.75 g of nickel nanoparticles 8 in a yield of 98.5%. In addition, the mixing ratio of nickel acetate to nickel formate was 7:3 (molar ratio).

Example 1-9

Nickel nanoparticles 9 were obtained by the same operation as in Example 1-7, except that 7.09 g of nickel acetate tetrahydrate and 0.28 g of nickel formate dihydrate were used instead of 6.71 g of nickel acetate tetrahydrate and 0.55 g of nickel formate dihydrate. More specifically, a complexed reaction solution 9 was obtained as in Example 1-7 and heated by a microwave to obtain a Ni-nanoparticle slurry 9, and then toluene/methanol cleaning and drying were conducted to obtain 1.73 g of nickel nanoparticles 9 in a yield of 97.6%. In addition, the mixing ratio of nickel acetate to nickel formate was 9.5:0.5 (molar ratio).

Example 1-10

Nickel nanoparticles 10 were obtained by the same operation as in Example 1-7, except that 81.6 g of dodecylamine, 5.47 g of nickel acetate tetrahydrate and 4.06 g of nickel formate dihydrate were used instead of 55.6 g of dodecylamine, 6.71 g of nickel acetate tetrahydrate and 0.55 g of nickel formate dihydrate. More specifically, a complexed reaction solution 10 was obtained as in Example 1-7 and heated by a microwave to obtain a Ni-nanoparticle slurry 10, and then toluene/methanol cleaning and drying were conducted to obtain 2.49 g of nickel nanoparticles 10 in a yield of 95.2%. In addition, the mixing ratio of nickel acetate to nickel formate was 5:5 (molar ratio).

Example 1-11

A complexed reaction solution 11 was obtained as in Example 1-1 and then heated by a microwave to obtain a Ni-nanoparticle slurry 11. Then, toluene/methanol cleaning and drying were conducted to obtain uniform nickel nanoparticles 11 having a spherical shape and an average particle size of 100 nm.

4.0 g of the nickel nanoparticles 11 was added in 40.0 g of oleylamine, and the mixture was heated by a mantle heater at 320° C. for 30 minutes under a nitrogen flow to obtain a carbonized Ni-nanoparticle slurry 11.

After the carbonized Ni-nanoparticle slurry 11 was placed still to be separated, the supernatant was removed, toluene and methanol were each used to clean the product three times, and then the product was dried by a vacuum dryer maintained at 60° C. for 6 hours to obtain carbonized nickel nanoparticles 11.

Figure 7:
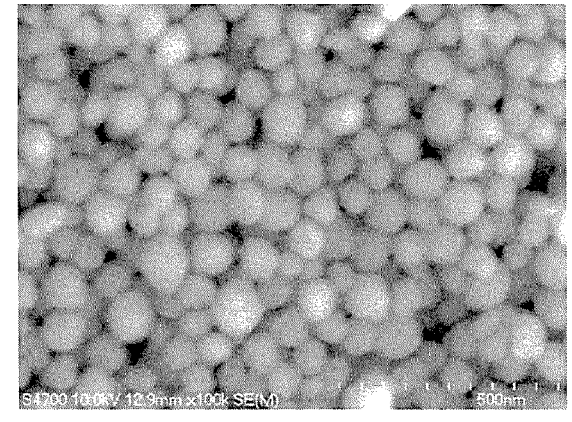
FIG. 7 shows a SEM image of the carbonized nickel nanoparticles obtained in Example 1-11.
Figure 8:
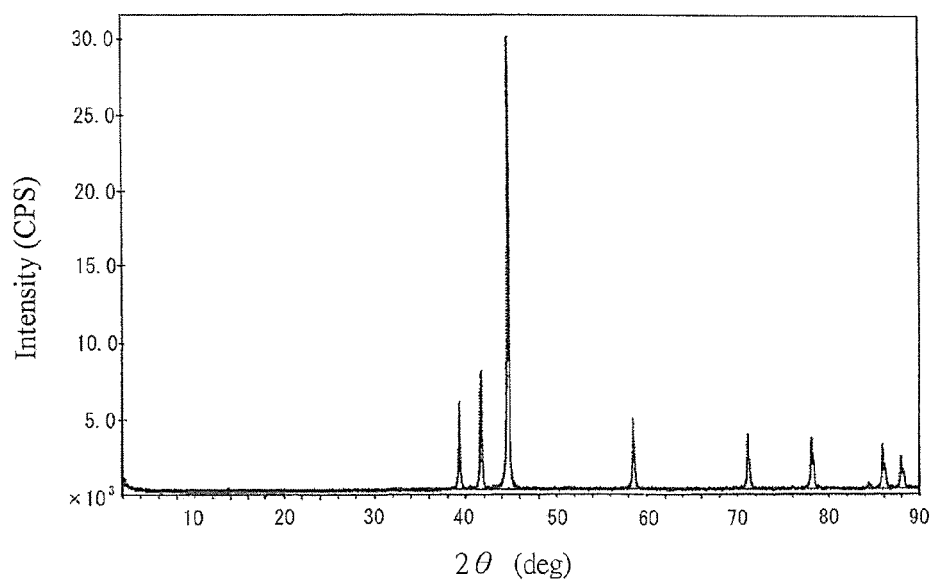
FIG. 8 shows an XRD spectrum of the carbonized nickel nanoparticles obtained in Example 1-11.

A SEM image of the obtained carbonized nickel nanoparticles 11 is shown in FIG. 7. It is identified from FIG. 7 that they were uniform particles having a spherical shape and an average particle size of 100 nm. Moreover, the result of the XRD (X-ray diffraction) measurement of the powder is shown in FIG. 8. From FIG. 8, peaks of the HCP (hexagonal closest packing) structure from $Ni_3C$ rather than the FCC (face-centered cubic) structure from Ni were identified. Moreover, the composition of the carbonized nickel nanoparticles 11 was determined by an element analyzing apparatus to include 90.5 mass % of nickel, 7.3 mass % of carbon, 0.2 mass % of hydrogen and 1.4 mass % of oxygen, and therefore was a composition close to $Ni_3C$.

Example 1-12

20.02 g of nickel acetate tetrahydrate was added in 128.0 g of oleylamine, and the mixture was heated at 130° C. for 20 minutes under a nitrogen flow to dissolve the nickel acetate and obtain a complexed reaction solution 12. Then, 0.058 g of silver nitrate was added in the complexed reaction solution 12, oleylamine was further added in an amount of 98.0, and a microwave is used to heat the solution at 250° C. for 5 minutes to obtain a Ni-nanoparticle slurry 12.

As in Example 1-1, toluene/methanol cleaning and drying were then conducted to the Ni-nanoparticle slurry 12 to obtain uniform nickel nanoparticles 12 having a spherical shape and an average particle size of 20 mm 4.0 g of the nickel nanoparticles 12 was added in 40.0 g of oleylamine, and the mixture was heated by a mantle heater at 320° C. for 30 minutes under a nitrogen flow to obtain a carbonized Ni-nanoparticle slurry 12.

After the carbonized Ni-nanoparticle slurry 12 was placed still to be separated, the supernatant was removed, toluene and methanol were each used to clean the product three times, and then the product was dried by a vacuum dryer maintained at 60° C. for 6 hours to obtain carbonized nickel nanoparticles 12.

Figure 9:
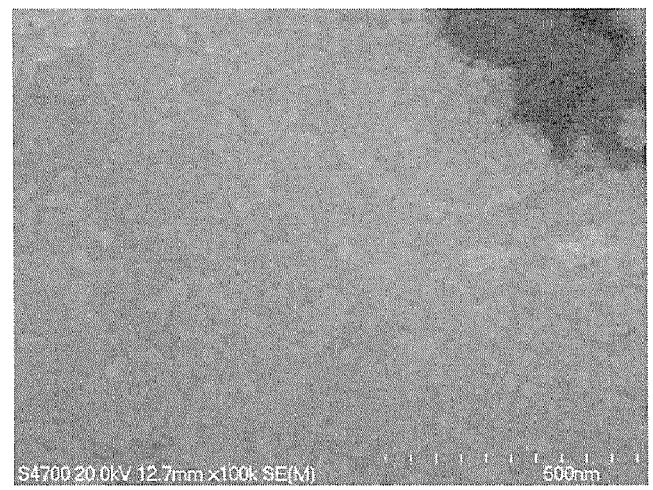
FIG. 9 shows a SEM image of the carbonized nickel nanoparticles obtained in Example 1-12.
Figure 10:
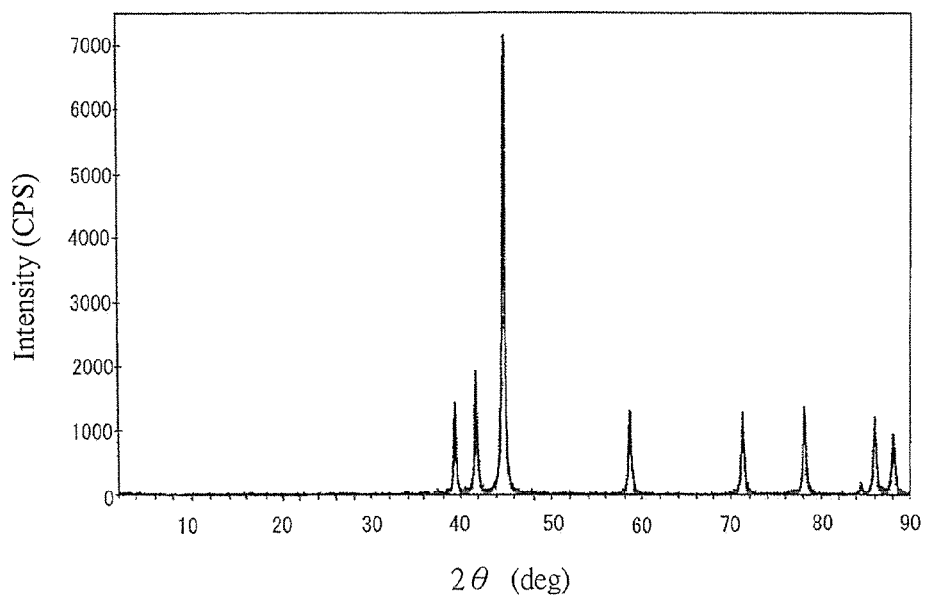
FIG. 10 shows an XRD spectrum of the carbonized nickel nanoparticles obtained in Example 1-12.

A SEM image of the obtained carbonized nickel nanoparticles 12 is shown in FIG. 9. It is identified from FIG. 9 that they were uniform particles having a spherical shape and an average particle size of 20 nm. Moreover, the result of the XRD (X-ray diffraction) measurement of the powder is shown in FIG. 10. From FIG. 10, peaks of the HCP (hexagonal closest packing) structure from $Ni_3C$ rather than the FCC (face-centered cubic) structure from Ni were identified. Moreover, the composition of the carbonized nickel nanoparticles 12 was determined by an element analyzing apparatus to include 88.0 mass % of nickel, 8.0 mass % of carbon, 0.2 mass % of hydrogen and 1.7 mass % of oxygen, and therefore was a composition close to $Ni_3C$.

Reference Example 1-1

A complexed reaction solution was obtained as in Example 1-1 and then heated by a microwave to obtain a Ni-nanoparticle slurry. Then, toluene/methanol cleaning and drying were conducted to obtain uniform nickel nanoparticles having a spherical shape and an average particle size of 100 nm.

4.0 g of the obtained nickel nanoparticles was added in 40.0 g of tetraethylene glycol, and the mixture was heated by a mantle heater at 250° C. for 30 minutes under a nitrogen flow to obtain a carbonized Ni-nanoparticle slurry.

After the carbonized Ni-nanoparticle slurry was placed still to be separated, the supernatant was removed, toluene and methanol were each used to clean the product three times, and then the product was dried by a vacuum dryer maintained at 60° C. for 6 hours to obtain carbonized nickel nanoparticles.

Figure 11:
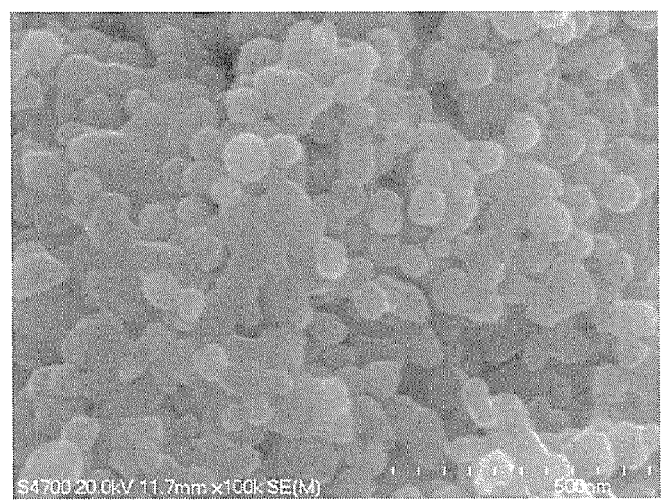
FIG. 11 shows a SEM image of the carbonized nickel nanoparticles obtained in Reference Example 1-1.
Figure 12:
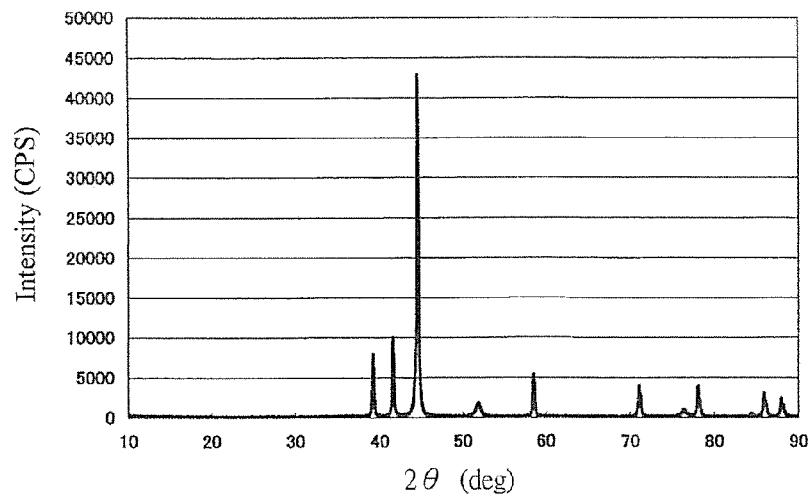
FIG. 12 shows an XRD spectrum of the carbonized nickel nanoparticles obtained in Reference Example 1-1.

A SEM image of the obtained carbonized nickel nanoparticles is shown in FIG. 11. It is identified from FIG. 11 that although they were uniform particles having a spherical shape and an average particle size of 100 nm, they merged with each other. Moreover, the result of the XRD (X-ray diffraction) measurement of the powder is shown in FIG. 12. From FIG. 12, peaks of the HCP (hexagonal closest packing) structure from $Ni_3C$ rather than the FCC (face-centered cubic) structure from Ni were identified.

Example 1-13

20.02 g of nickel acetate tetrahydrate was added in 128.4 g of oleylamine, and the mixture was heated at 130° C. for 20 minutes under a nitrogen flow to dissolve the nickel acetate and obtain a complexed reaction solution 13. Then, oleylamine was further added in an amount of 98.4 g, and a microwave is used to heat the solution at 300° C. for 30 minutes to obtain a carbonized Ni-nanoparticle slurry 13.

After the carbonized Ni-nanoparticle slurry 13 was placed still to be separated, the supernatant was removed, toluene and methanol were each used to clean the product three times, and then the product was dried by a vacuum dryer maintained at 60° C. for 6 hours to obtain carbonized nickel nanoparticles 13.

Figure 13:
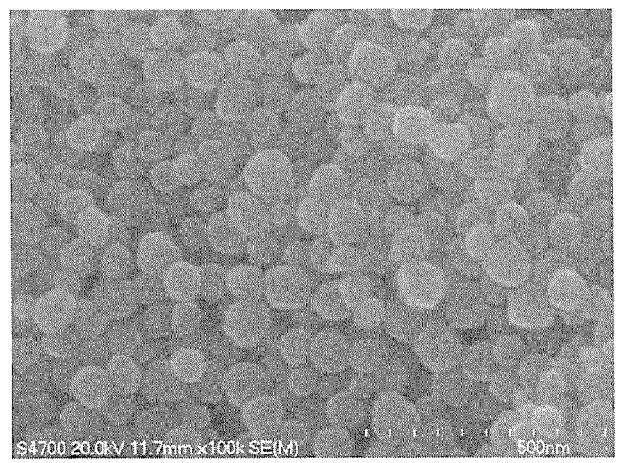
FIG. 13 shows a SEM image of the carbonized nickel nanoparticles obtained in Example 1-13.
Figure 14:
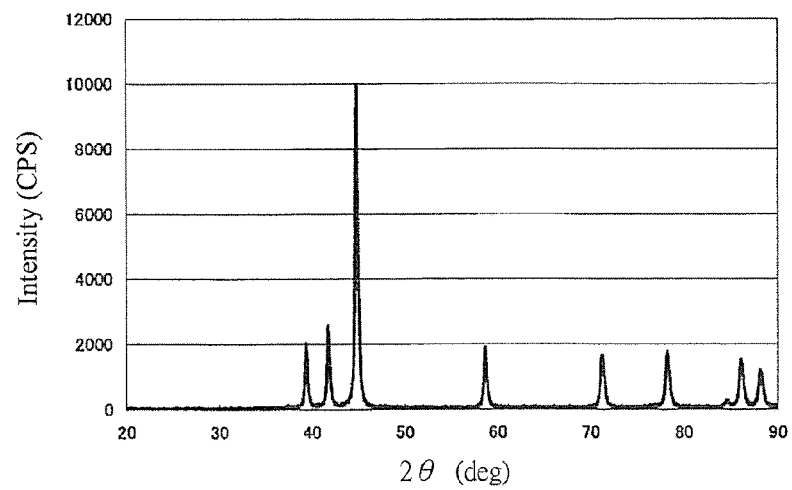
FIG. 14 shows an XRD spectrum of the carbonized nickel nanoparticles obtained in Example 1-13.

A SEM image of the obtained carbonized nickel nanoparticles 13 is shown in FIG. 13. It is identified from FIG. 13 that they were uniform particles having a spherical shape and an average particle size of 100 nm. Moreover, the result of the XRD (X-ray diffraction) measurement of the powder is shown in FIG. 14. From FIG. 14, peaks of the HCP (hexagonal closest packing) structure from $Ni_3C$ rather than the FCC (face-centered cubic) structure from Ni were identified. Moreover, the composition of the carbonized nickel nanoparticles 13 was determined by an element analyzing apparatus to include 91.3 mass % of nickel, 7.4 mass % of carbon, 0.2 mass % of hydrogen and 1.0 mass % of oxygen, and therefore was a composition close to $Ni_3C$.

Example 1-14

A carbonized nickel nanoparticles slurry 14 was obtained in the same manner as in Example 1-13 except that the microwave heating was conducted at 260° C. for 30 min but was not conducted at 300° C. for 30 min as in Example 1-13, and then carbonized nickel nanoparticles slurry 14 were obtained.

Figure 15:
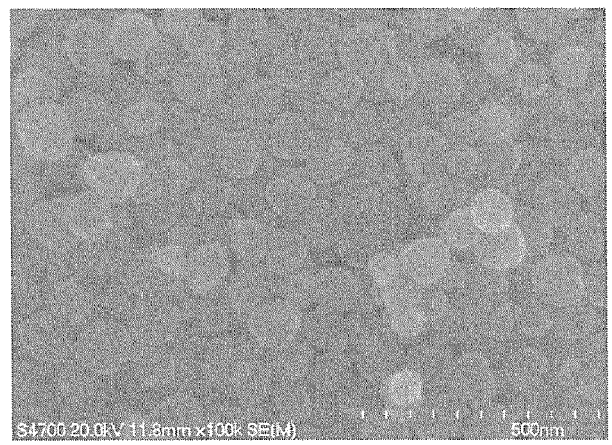
FIG. 15 shows a SEM image of the carbonized nickel nanoparticles obtained in Example 1-14.
Figure 16:
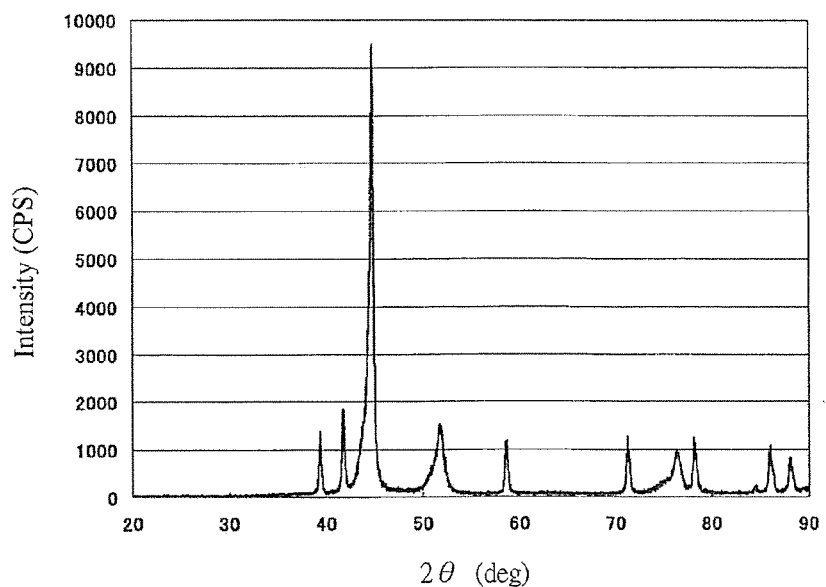
FIG. 16 shows an XRD spectrum of the carbonized nickel nanoparticles obtained in Example 1-14.

A SEM image of the obtained carbonized nickel nanoparticles 14 is shown in FIG. 15. It is identified from FIG. 15 that they were uniform particles having a spherical shape and an average particle size of 80 nm. Moreover, the result of the XRD (X-ray diffraction) measurement of the powder is shown in FIG. 16. From FIG. 16, a mixture of peaks of the FCC (face-centered cubic) structure from Ni and peaks of the HCP (hexagonal closest packing) structure from $Ni_3C$ was identified. Moreover, the composition of the carbonized nickel nanoparticles 14 was determined by an element analyzing apparatus to include 92.1 mass % of nickel, 3.7 mass % of carbon, 0.1 mass % of hydrogen and 1.4 mass % of oxygen.

In the following Examples 2-1 to 2-4 and Reference Examples 2-1 and 2-2, the dispersity of the Ni-nanoparticles was evaluated by placing the Ni-nanoparticles in toluene as a solvent in an amount of 1 mass % relative to the total mass of toluene and nickel, dispersing the nanoparticles by an ultrasonic wave, and determining the time from the initial colored state possibly with a black color to the state where 50% of the volume of the entire solution became transparent. When the time was 6 hours or longer, the dispersity was considered good.

Example 2-1

14.8 g of nickel acetate dihydrate was added in 128.8 g of oleylamine, and the mixture was heated at 120° C. for 20 minutes under a nitrogen flow to obtain a complexed reaction solution. Then, 0.069 g of silver nitrate (with 1 part by mass of silver relative to 100 parts by mass of nickel) was added in the complexed reaction solution, and 98.2 g of 1-octanol was further added. Thereafter, a microwave was used to heat the solution at 210° C. for 5 minutes to obtain a Ni-nanoparticle slurry. After the carbonized Ni-nanoparticle slurry was placed still to be separated, the supernatant was removed, methanol was used to clean the product three times, and then the product was dried by a vacuum dryer maintained at 60° C. for 6 hours to obtain nickel nanoparticles.

Figure 17:
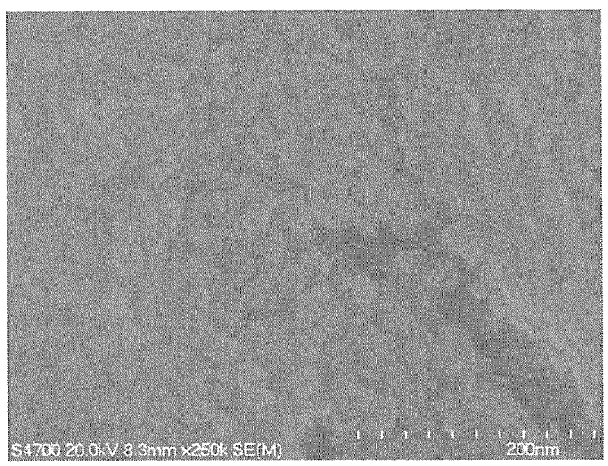
FIG. 17 shows a SEM image of the nickel nanoparticles obtained in Example 2-1.

A SEM image of the obtained carbonized nickel nanoparticles is shown in FIG. 17. Uniform particles having a spherical shape and an average particle size of 30 nm were obtained. Moreover, the dispersity of the nickel nanoparticles was good.

Examples 2-2 to 2-4

The nickel nanoparticles of Examples 2-2 to 2-4 were produced in the same condition of Example 2-1, except that the species of the combination of the nickel salt and the later added metal salt was changed and the microwave heating was conducted at a temperature of 190° C. for 5 minutes. The particle sizes and so on of the nickel nanoparticles are shown in Table 5. It was confirmed from Table 5 that even if the species of the combination of the nickel salt and the later added metal salt was changed, the particle sizes were still appropriate. Further, the dispersity of nickel nanoparticles was good in any of the examples.

TABLE 5

| | Nickel salt | Later added metal salt | Amount (part by mass) of the metal in the later added metal salt, relative to 100 parts by mass of nickel | Average particle size (nm) |
|---|---|---|---|---|
| Example 2-2 | Nickel acetate | Chloroplatinic acid | 1 | 27 |
| Example 2-3 | Nickel acetate | Chloroauric acid | 1 | 25 |
| Example 2-4 | Nickel acetate | Palladium acetate | 3 | 40 |

Reference Example 2-1

Nickel nanoparticles having an average particle size of 100 nm and a CV value of 0.17 were obtained in the same manner of Example 2-4, except that palladium acetate was not used.

Reference Example 2-2

Nickel nanoparticles having an average particle size of 55 nm and a CV value of 0.20 were obtained as in the same manner of Example 2-4, except that the microwave heating at 210° C. for 5 minutes was replaced by oil-bath heating at 210° C. for 5 minutes. It was known form the result that as compared to the cases of microwave heating, the ordinary heating causes a slightly larger average particle size and a broad particle-size distribution and is therefore not preferred. Moreover, the CV value of the nickel nanoparticles obtained in Example 2-4 was 0.12.

In the following Examples 3-1 to 3-5, the dispersity of the Ni-nanoparticles was evaluated by placing the same, into toluene as a solvent, in an amount of 1 mass % relative to the total mass of toluene and nickel, dispersing the nanoparticles by an ultrasonic wave for 5 minutes, and determining the time required for the solution to become transparent. A case where the toluene solution had a black color uniformly after 6 hours from the ultrasonic dispersion is marked by "o" (good). A case where the toluene solution had a black color and some precipitation was identified after 2 or more but less than 6 hours is marked by "Δ" (acceptable). A case where precipitation of nanoparticles was identified after a period less than 2 hours is marked by "x" (bad).

Example 3-1

20.02 g of nickel acetate tetrahydrate was added in 128.4 g of oleylamine, and the mixture was heated at 120° C. for 20 minutes under a nitrogen flow to obtain a complexed reaction solution. Then, 98.0 g of 1-octanol and 0.47 g of a carboxylic acid of 3 to 5 valences (KD-9, from CRODA Corporation) were added in the complexed reaction solution, and a microwave was used to heat the solution at 210° C. for 5 minutes to obtain a Ni-nanoparticle slurry.

Figure 18:
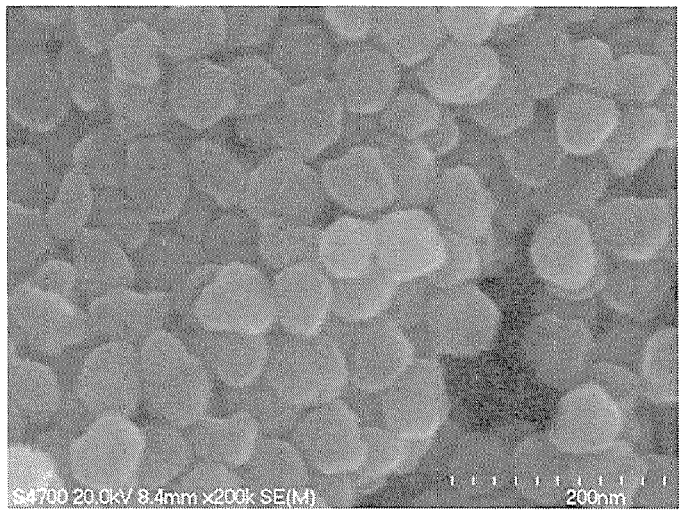
FIG. 18 shows a SEM image of the nickel nanoparticles obtained in Example 3-1.

After the Ni-nanoparticle slurry was placed still to be separated, the supernatant was removed, methanol was used to clean the product three times, and then the product was dried by a vacuum dryer maintained at 60° C. for 6 hours to obtain nickel nanoparticles. A SEM (scanning electron microscope) image of the obtained nickel nanoparticles is shown in FIG. 18. It is known from FIG. 18 that they were uniform particles having a spherical shape and an average particle size of 80 nm. Moreover, in the evaluation test for the dispersity of nickel nanoparticles, the dispersity of the nickel nanoparticles was confirmed to be good because the initial state with a black color did not change even after 6 hours.

Example 3-2

20.02 g of nickel acetate tetrahydrate was added in 128.4 g of oleylamine, and the mixture was heated at 120° C. for 20 minutes under a nitrogen flow to obtain a complexed reaction solution. Then, 0.47 g of a carboxylic acid of 5 to 8 valences (KD-9, from CRODA Corporation) and 98.6 g of 1-octanol were added in the complexed reaction solution, and a microwave was used to heat the solution at 210° C. for 5 minutes to obtain a Ni-nanoparticle slurry.

Figure 19:
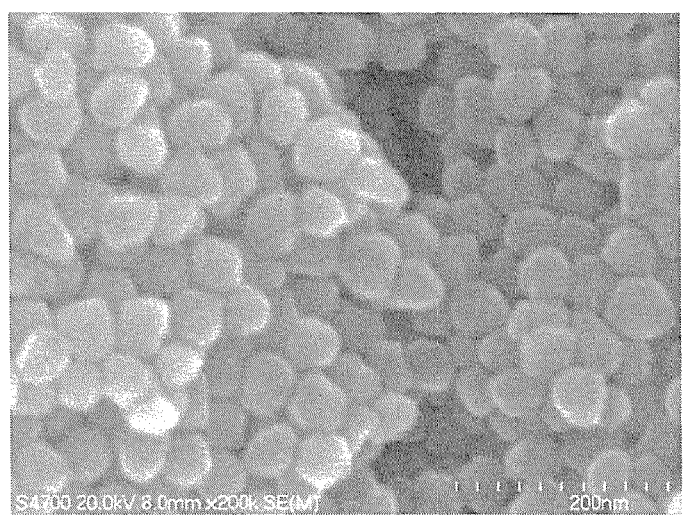
FIG. 19 shows a SEM image of the nickel nanoparticles obtained in Example 3-2.

After the Ni-nanoparticle slurry was placed still to be separated, the supernatant was removed, methanol was used to clean the product three times, and then the product was dried by a vacuum dryer maintained at 60° C. for 6 hours to obtain nickel nanoparticles. A SEM (scanning electron microscope) image of the obtained nickel nanoparticles is shown in FIG. 19. It is known from FIG. 19 that uniform particles having a spherical shape and an average particle size of 50 nm were formed. Moreover, in the evaluation test for the dispersity of nickel nanoparticles, the dispersity of the nickel nanoparticles was confirmed to be good because the initial state with a black color did not change even after 6 hours.

The above results were shown in Table 6.

TABLE 6

| Species of the straight carboxylic acid or sulfonic acid | Amount (part by mass) of the straight carboxylic acid or sulfonic acid relative to 100 parts by mass of nickel | Average particle size (nm) | Dispersity |
|---|---|---|---|
| Example 3-1: KD-9 (3-5 valent carboxylic acid) | 10 | 80 | ○ |
| Example 3-2: KD-4 (5-8 valent carboxylic acid) | 10 | 50 | ○ |

Examples 3-3 to 3-5

Table 7 shows the particle sizes and so on of the nickel nanoparticles prepared in the same condition of Example 3-1 except that the addition amount of the multi-valent carboxylic acid was changed, wherein the result of Example 3-1 is shown again. It is known from Table 7 that good dispersity was shown when the addition amount of the carboxylic acid is 3 or more parts by mass relative to, in terms of metal, 100 parts by mass of nickel.

TABLE 7

| Species of the straight carboxylic acid | Amount (part by mass) of the straight carboxylic acid relative to 100 parts by mass of nickel | Average particle size (nm) | Dispersity |
|---|---|---|---|
| Example 3-3: KD-9 (4-valent carboxylic acid) | 1 | 60 | Δ |
| Example 3-4: KD-9 (4-valent carboxylic acid) | 3 | 60 | ○ |
| Example 3-1: KD-9 (4-valent carboxylic acid) | 10 | 80 | ○ |
| Example 3-5: KD-9 (4-valent carboxylic acid) | 20 | 70 | ○ |

In the following Examples 4-1 of 4-5, the behavior of thermal expansion/shrinkage of the nanoparticles was identified by using a thermal mechanical analyzer (TMA) (Thermo plus EVO-TMA8310, manufactured by Rigaku Corporation).

Example 4-1

20.18 g of nickel acetate tetrahydrate and 0.51 g of tungsten chloride were added in 128.4 g of oleylamine, and the mixture was heated at 120° C. for 20 minutes under a nitrogen flow to obtain a complexed reaction solution. Then, 98.4 g of 1-octanol was added in the complexed reaction solution, and a microwave was used to heat the solution at 210° C. for 5 min to obtain a nickel/tungsten composite nanoparticle slurry.

After the nickel/tungsten composite nanoparticle slurry was placed still to be separated, the supernatant was removed, methanol was used to clean the product three times, and then the product was dried by a vacuum dryer maintained at 60° C. for 6 hours to obtain nickel/tungsten composite nanoparticles.

Figure 20:
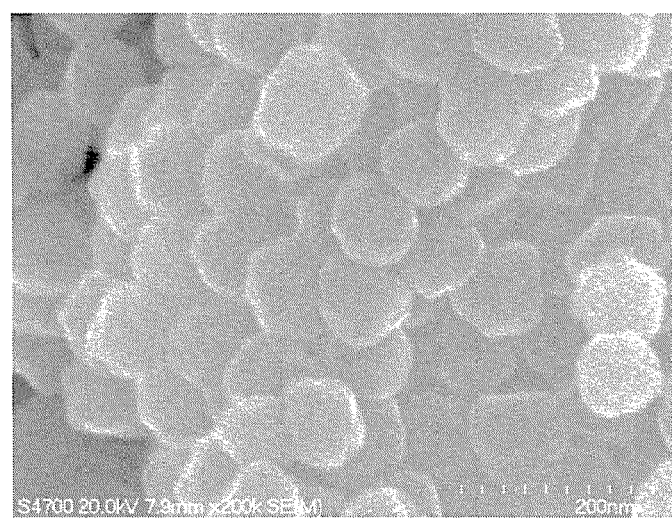
FIG. 20 shows a SEM image of the nickel/tungsten composite nanoparticles obtained in Example 4-1.
Figure 21:
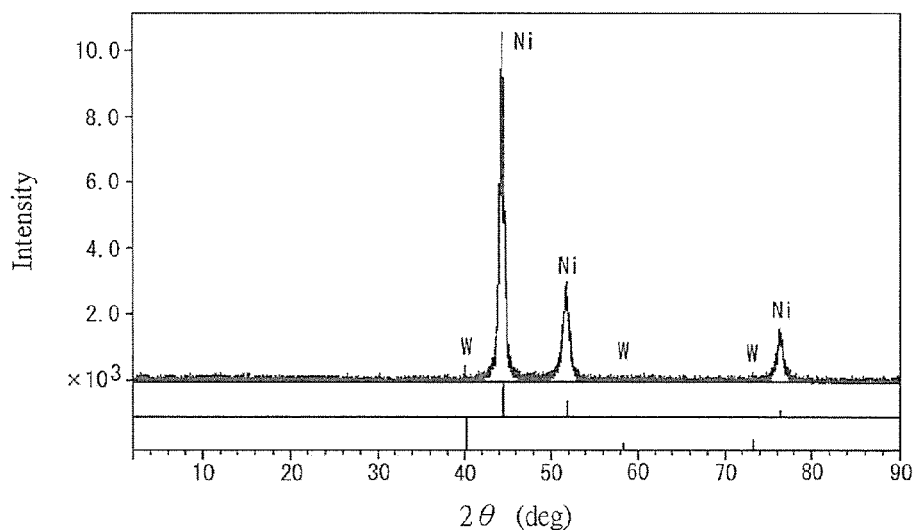
FIG. 21 shows an XRD spectrum of the nickel/tungsten composite nanoparticles obtained in Example 4-1.
Figure 22:
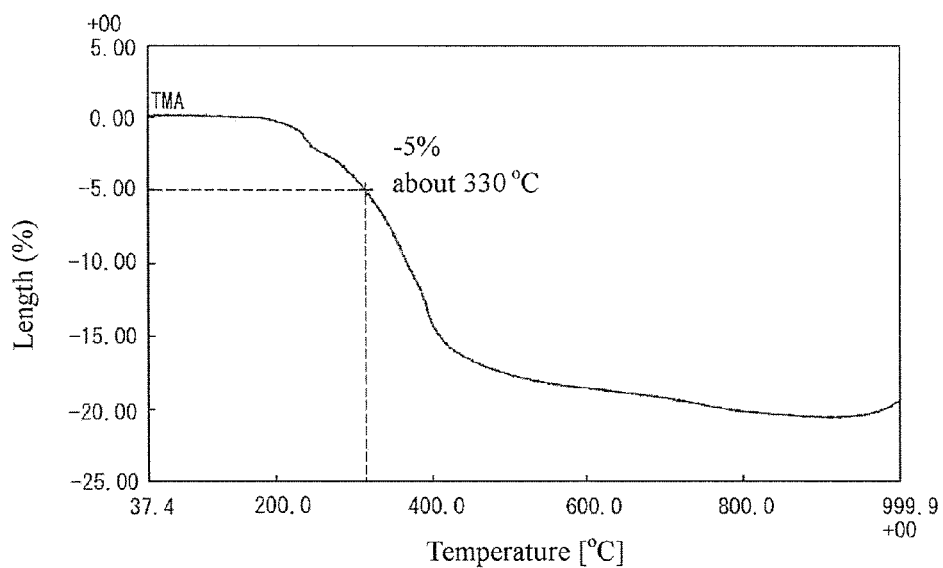
FIG. 22 is a plot showing the behavior of thermal expansion and shrinkage of the nickel/tungsten composite nanoparticles obtained in Example 4-1.
Figure 23A:
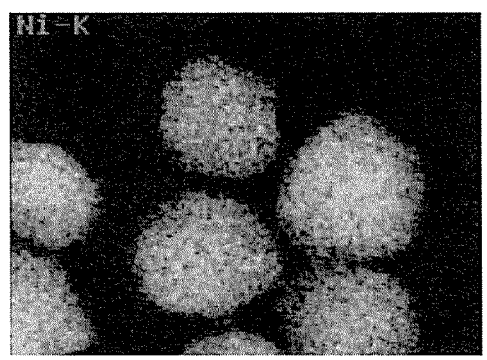
FIG. 23A shows a TEM-EDS mapping image for the nickel distribution in the nickel/tungsten composite nanoparticles obtained in Example 4-1.
Figure 23B:
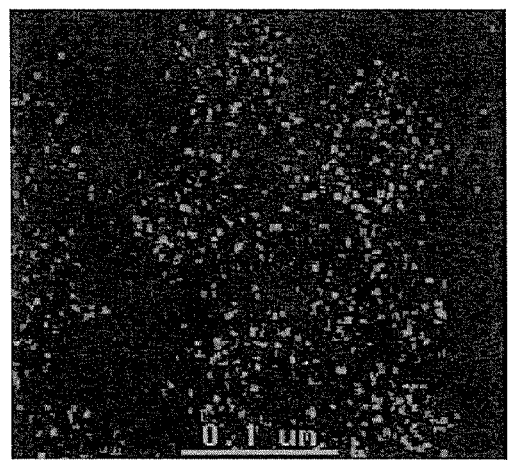
FIG. 23B shows a TEM-EDS mapping image for the tungsten distribution in the nickel/tungsten composite nanoparticles obtained in Example 4-1.

A SEM (scanning electron microscope) image of the obtained nickel/tungsten composite nanoparticles is shown in FIG. 20. It is known from FIG. 20 that uniform particles having a spherical shape and an average particle size of 75 nm were formed. Moreover, the XRD measurement result of the nickel/tungsten composite nanoparticles is shown in FIG. 21. From FIG. 21, peaks of the FCC (face-centered cubic) structure of tungsten in addition to the FCC structure of nickel can be identified. Moreover, the result of the TMA measurement is shown in FIG. 22. From FIG. 22, the temperature at 5% thermo-shrinkage can be identified to be about 330° C. Further, photographs of the mapping images obtained by using a transmission electron microscope of TEM-EDS type are shown in FIGS. 23A and 23B, wherein the photograph of FIG. 23A shows the distribution of nickel and that of FIG. 23B shows the distribution of tungsten. It is confirmed from FIGS. 23A and 23B that tungsten is distributed in a homogeneous manner relative to the distribution of nickel.

Example 4-2

20.18 g of nickel acetate tetrahydrate and 1.03 g of tungsten chloride were added in 128.4 g of oleylamine, and the mixture was heated at 120° C. for 20 minutes under a nitrogen flow to obtain a complexed reaction solution. Then, 98.4 g of 1-octanol was added in the complexed reaction solution, and a microwave was used to heat the solution at 210° C. for 5 min to obtain a nickel/tungsten composite nanoparticle slurry.

After the nickel/tungsten composite nanoparticle slurry was placed still to be separated, the supernatant was removed, methanol was used to clean the product three times, and then the product was dried by a vacuum dryer maintained at 60° C. for 6 hours to obtain nickel/tungsten composite nanoparticles.

Figure 24:
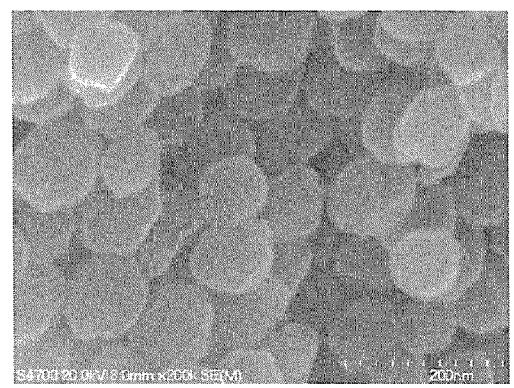
FIG. 24 shows a SEM image of the nickel/tungsten composite nanoparticles obtained in Example 4-2.
Figure 25:
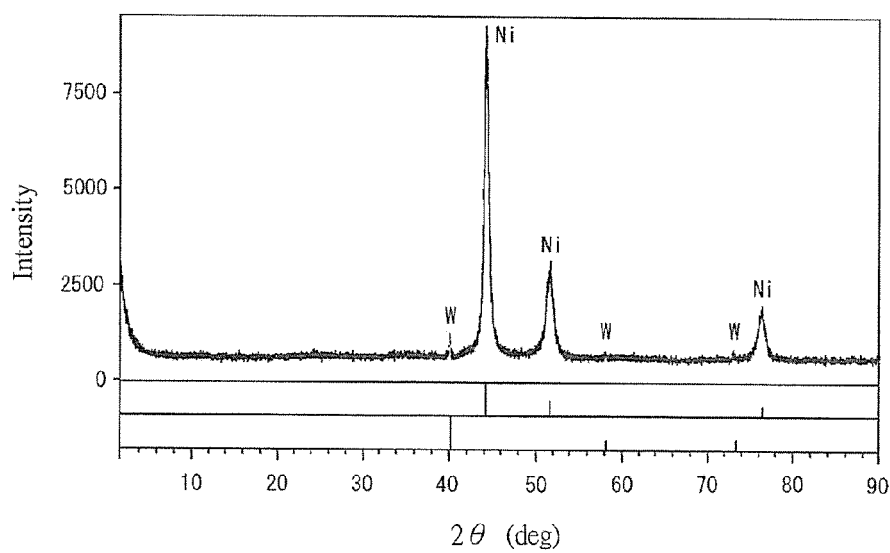
FIG. 25 shows an XRD spectrum of the nickel/tungsten composite nanoparticles obtained in Example 4-2.
Figure 26:
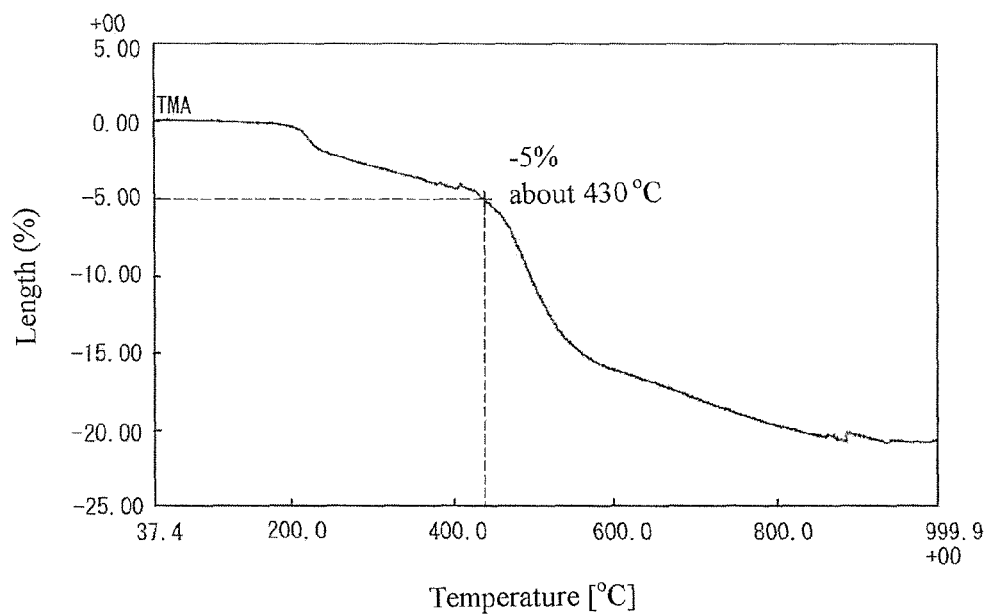
FIG. 26 is a plot showing the behavior of thermal expansion and shrinkage of the nickel/tungsten composite nanoparticles obtained in Example 4-2.

A SEM image of the obtained nickel/tungsten composite nanoparticles is shown in FIG. 24. It is known from FIG. 24 that uniform particles having a spherical shape and an average particle size of 90 nm were formed. Moreover, the result of the XRD measurement is shown in FIG. 25. From FIG. 25, peaks of the FCC (face-centered cubic) structure of tungsten in addition to the FCC structure of nickel can be identified. Moreover, the result of the TMA measurement is shown in FIG. 26, from which the temperature at 5% thermo-shrinkage can be identified to be about 430° C.

Example 4-3

20.18 g of nickel acetate tetrahydrate and 2.10 g of tungsten chloride were added in 128.4 g of oleylamine, and the mixture was heated at 120° C. for 20 minutes under a nitrogen flow to obtain a complexed reaction solution. Then, 98.4 g of 1-octanol was added in the complexed reaction solution, and a microwave was used to heat the solution at 210° C. for 5 min to obtain a nickel/tungsten composite nanoparticle slurry.

After the nickel/tungsten composite nanoparticle slurry was placed still to be separated, the supernatant was removed, methanol was used to clean the product three times, and then the product was dried by a vacuum dryer maintained at 60° C. for 6 hours to obtain nickel/tungsten composite nanoparticles.

Figure 27:
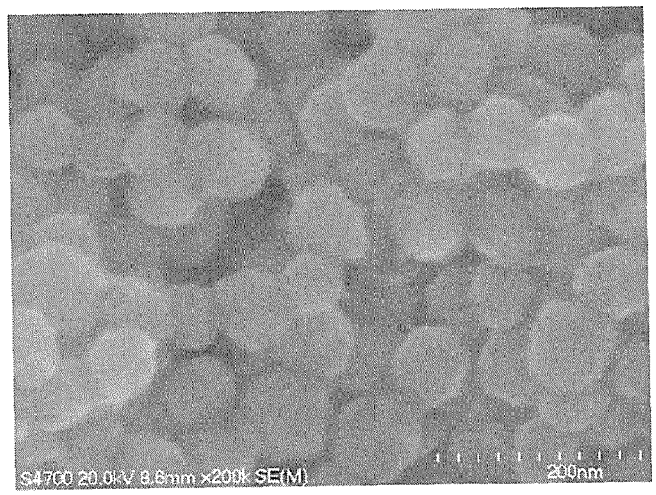
FIG. 27 shows a SEM image of the nickel/tungsten composite nanoparticles obtained in Example 4-3.

A SEM image of the obtained nickel/tungsten composite nanoparticles is shown in FIG. 27. It is identified from FIG. 27 that uniform particles having a spherical shape and an average particle size of 70 run were formed. Moreover, from the result of the TMA measurement, the temperature at 5% thermo-shrinkage can be identified to be about 680° C.

Example 4-4

20.2 g of nickel acetate dihydrate was added in 128.4 g of oleylamine, and the mixture was heated at 120° C. for 20 minutes under a nitrogen flow to obtain a complexed reaction solution. Then, 0.75 g of molybdenum chloride was added in the complexed reaction solution so that the amount of molybdenum is 5 mass % of that of nickel, and then 200.4 g of 1-octanol was added. Thereafter, a microwave was used to heat the solution at 210° C. for 5 min to obtain a nickel/molybdenum composite nanoparticle slurry.

After the nickel/molybdenum composite nanoparticle slurry was placed still to be separated, the supernatant was removed, methanol was used to clean the product three times, and then the product was dried by a vacuum dryer maintained at 60° C. for 6 hours to obtain nickel/molybdenum composite nanoparticles, which had a spherical shape and an average particle size of 80 nm.

Example 4-5

20.2 g of nickel acetate dihydrate was added in 128.4 g of oleylamine, and the mixture was heated at 120° C. for 20 minutes under a nitrogen flow to obtain a complexed reaction solution. Then, 200.4 g of 1-octanol was added. Thereafter, a microwave was used to heat the solution at 210° C. for 5 min to obtain a Ni-nanoparticle slurry. Directly after this, another complexed reaction solution containing a salt of refractory metal, which was prepared in advance in another reaction container, was added in the Ni-nanoparticle slurry, and then a microwave was used to heat the slurry at 210° C. for 5 min to obtain a nickel/tungsten composite nanoparticle slurry. The added complexed reaction solution containing the salt of refractory metal was prepared in advance in the another reaction container by adding 0.51 g of tungsten chloride in 20 g of oleylamine and then heating the mixture at 120° C. for 20 minutes by using a mantle heater under a nitrogen flow.

After the nickel/tungsten composite nanoparticle slurry was placed still to be separated, the supernatant was removed, methanol was used to clean the product three times, and then the product was dried by a vacuum dryer maintained at 60° C. for 6 hours to obtain nickel/tungsten composite nanoparticles, which had a spherical shape and an average particle size of 80 nm.

The results of Examples 4-1 to 4-5 are shown in Table 8. It is known from Table 8 that the starting temperature of 5% thermo-shrinkage was raised when the W/Ni ratio in the preparation is increased.

TABLE 8

| | W/Ni or Mo/Ni ratio (mass ratio) (%) in the preparation | Average particle size (nm) | CV | Shape | Starting temperature (° C.) of 5% thermo-shrinkage |
|---|---|---|---|---|---|
| Example 4-1 | 5 | 75 | 0.15 | Spherical | 330 |
| Example 4-2 | 10 | 90 | 0.16 | Spherical | 430 |
| Example 4-3 | 20 | 70 | 0.16 | Spherical | 680 |
| Example 4-4 | 5 | 80 | 0.15 | Spherical | 420 |
| Example 4-5 | 5 | 80 | 0.15 | Spherical | 340 |

What is claimed is:

1. A method for producing nickel nanoparticles, comprising:
    a first step, comprising heating a mixture of a nickel carboxylate and a primary amine to obtain a complexed reaction solution with a nickel complex formed therein, wherein the nickel carboxylate has 1-12 carbon atoms in its moiety excluding —COOH; and
    a second step, comprising heating the complexed reaction solution by a microwave to obtain a Ni-nanoparticle slurry, wherein the heating in the second step is conducted at a temperature of 180° C. or higher.

2. The method of claim 1, wherein the heating in the first step is conducted at a temperature of 105-175° C.

3. The method of claim 1, wherein the nickel carboxylate has 1-8 carbon atoms in its moiety excluding —COOH.

4. The method of claim 1, wherein the primary amine comprises an aliphatic amine.

5. The method of claim 4, wherein the aliphatic amine comprises oleylamine or dodecylamine.

6. The method of claim 1, wherein the nickel carboxylate used in the first step has a straight chain of 1 or 2 carbon atoms as its moiety excluding —COOH, the method further comprising, between the first step and the second step, a step of adding, in the complexed reaction solution, one, two or more metal salts selected from the group consisting of palladium salts, silver salts, platinum salts and gold salts.

7. The method of claim 6, wherein in the step of adding the metal salt(s), the metal salt(s) is added in a manner such that, in terms of metal, an amount of metal in the metal salt(s) is 0.01 part by mass relative to 100 parts by mass of nickel in the nickel carboxylate.

8. The method of claim 1, wherein in the second step, the heating is conducted in a state that a multi-valent carboxylic acid of 3 or more valences is present in the complexed reaction solution.

9. The method of claim 8, wherein at least before the heating in the second step, the multi-valent carboxylic acid is added in a stage of preparing the mixture, or is added in the mixture or in the complexed reaction solution.

10. The method of claim 9, wherein the multi-valent carboxylic acid comprises an acyclic carboxylic acid.

11. The method of claim 8, wherein the multi-valent carboxylic acid is added in an amount of 3 or more parts by mass relative to, in terms of metal, 100 parts by mass of nickel contained in the nickel carboxylate.

12. The method of claim 1, wherein at least before an irradiation of the microwave, a salt of a refractory metal having a melting point higher than a melting point of nickel is added in a stage of preparing the mixture, or is added in the mixture or in the complexed reaction solution, and then the heating by the microwave is conducted.

13. The method of claim 12, wherein in the first step, the salt of refractory metal is mixed with the nickel carboxylate and the primary amine to prepare the mixture.

14. The method of claim 12, wherein the salt of refractory metal comprises one selected from the group consisting of tungsten salts, molybdenum salts, vanadium salts and niobium salts, or a mixture of two or more selected from the same group.

15. The method of claim 12, wherein the salt of refractory metal is added in a manner such that, in terms of metal, an amount of metal therein is 1 to 30 parts by mass relative to 100 parts by mass of nickel in the nickel carboxylate.

16. The method of claim 1, further comprising a step comprising:
    adding a salt of a refractory metal having a melting point higher than a melting point of nickel to the Ni-nanoparticle slurry obtained in the second step; and
    heating the slurry by the microwave to compounding the refractory metal with the nickel nanoparticles.

17. The method of claim 1, wherein in the second step, a temperature of the heating by an irradiation of the microwave is 240° C. or higher, such that an organic substance present on surfaces of the nickel nanoparticles as formed is carbonized.

18. The method of claim 1, further comprising a step of re-heating the nickel nanoparticles formed in the second step to 240° C. or a higher temperature, such that an organic substance present on surfaces of the nickel nanoparticles is carbonized.

19. The method of claim 18, wherein the nickel nanoparticles are re-heated in presence of a primary amine.

20. The method of claim 1, wherein nickel formate is added together with the nickel carboxylate having 1-12 carbon atoms in its moiety excluding —COOH, in an amount of 5-50 mol % relative to the entire nickel carboxylate.

* * * * *